US011531688B2

(12) United States Patent
Nakamura

(10) Patent No.: US 11,531,688 B2
(45) Date of Patent: Dec. 20, 2022

(54) TIME-SERIES DATA PROCESSING DEVICE, TIME-SERIES DATA PROCESSING SYSTEM, AND TIME-SERIES DATA PROCESSING METHOD

(71) Applicant: MITSUBISHI ELECTRIC CORPORATION, Tokyo (JP)

(72) Inventor: Takaaki Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 572 days.

(21) Appl. No.: 16/496,201

(22) PCT Filed: May 12, 2017

(86) PCT No.: PCT/JP2017/018033
§ 371 (c)(1),
(2) Date: Sep. 20, 2019

(87) PCT Pub. No.: WO2018/207350
PCT Pub. Date: Nov. 15, 2018

(65) Prior Publication Data
US 2020/0151199 A1 May 14, 2020

(51) Int. Cl.
*G06F 16/00* (2019.01)
*G06F 16/28* (2019.01)
*G05B 19/418* (2006.01)

(52) U.S. Cl.
CPC ..... *G06F 16/285* (2019.01); *G05B 19/41835* (2013.01); *G05B 2219/31334* (2013.01)

(58) Field of Classification Search
CPC .. G06F 17/18; G06F 11/0736; G06F 11/0751; G06F 11/30; G06F 11/3006;
(Continued)

(56) References Cited

U.S. PATENT DOCUMENTS 5,273,049 A * 12/1993 Steinhaus ............ A61N 1/3621
600/515
2006/0189880 A1* 8/2006 Lynn .................... A61B 5/4818
600/300
(Continued)

FOREIGN PATENT DOCUMENTS

JP 2012-99067 A 5/2012
JP 2013-218725 A 10/2013
(Continued)

OTHER PUBLICATIONS

Chandola et al. "Detecting Anomalies in a Time Series Database", Dept. of Computer Science and Engineering, Univ. of Minnesota Technical Report, TR 09-004, Feb. 5, 2009, total 11 pages.
Imamura et al. "Leg Vibration Analysis for Time Series", Journal of Information Processing Society of Japan, vol. 57, No. 4, Apr. 2016, pp. 1303-1318.
Indian Office Action for Indian Application No. 201947043237, dated May 15, 2021, with English translation.

*Primary Examiner* — Shyue Jiunn Hwa
(74) *Attorney, Agent, or Firm* — Birch, Stewart, Kolasch & Birch, LLP

(57) ABSTRACT

An event waveform extracting unit (3) extracts an event waveform from time-series data. A co-occurrence rate calculating unit (4) calculates co-occurrence rates of event waveforms among the time-series data. A grouping unit (5) classifies the time-series data into groups depending the co-occurrence rates of the event waveforms. An event information generating unit (6) determines the time at which the periods during which event waveforms occur overlap with each other among the time-series data included in each group, and generates event information identifying an event related to the event waveforms on the basis of the determined time.

14 Claims, 16 Drawing Sheets

(58) Field of Classification Search
CPC .. G06F 11/3065; G06F 11/322; G06F 11/324; G06F 16/00; G06F 16/903; G06F 2201/81; G06F 7/08; G06F 16/2365; G06F 16/285; G06F 11/008; G06F 16/24578; G06F 16/2477; G06F 16/27; G06F 16/51; G06F 16/9038; G06F 16/951; G06F 30/23; H04N 9/87; G16H 10/60; G16H 15/00; G16H 30/20; G16H 30/40; G16H 40/60; G16H 50/20; G16H 50/50; G16H 50/70; G05B 19/41875; G05B 2219/24042; G05B 2219/32187; G05B 2219/32221; G05B 23/0221; G05B 23/0232; G05B 23/0254; G06K 9/00496; G06K 9/6282; G06N 20/00; G06N 5/02; G01N 2021/8909; G01N 21/89; G01N 33/2841; G01N 33/346

See application file for complete search history.

(56) References Cited

U.S. PATENT DOCUMENTS

| | | | |
|---|---|---|---|
| 2013/0343614 A1* | 12/2013 | Kyal | A61B 5/024 382/107 |
| 2017/0116319 A1 | 4/2017 | Zhou | |
| 2017/0139400 A1 | 5/2017 | Imamura et al. | |
| 2017/0316329 A1 | 11/2017 | Toyama | |
| 2022/0164325 A1* | 5/2022 | He | G06F 16/211 |

FOREIGN PATENT DOCUMENTS

| | | |
|---|---|---|
| JP | 5538597 B2 | 7/2014 |
| WO | WO 2015/173860 A1 | 11/2015 |
| WO | WO 2016/116961 A1 | 7/2016 |

\* cited by examiner

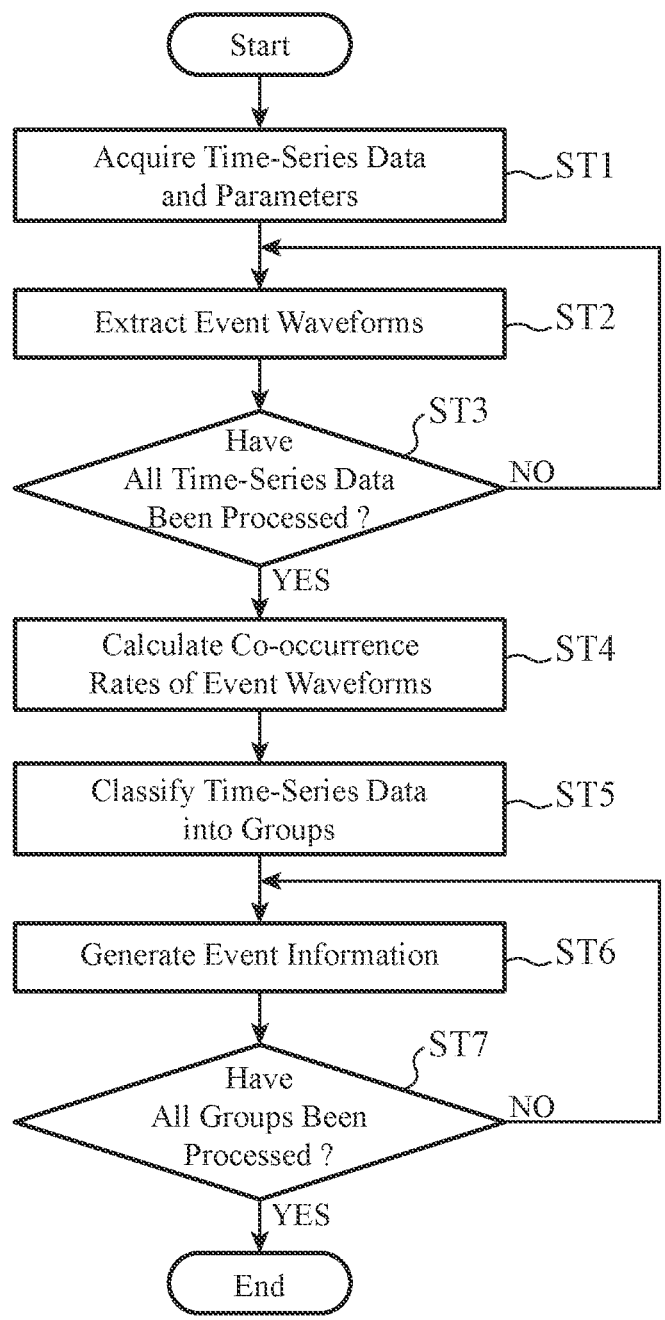

FIG. 6

| Starting Time | Ending Time | Period [Minute] | Maximum Amplitude | Average | Standard Deviation | Frequency |
|---|---|---|---|---|---|---|
| 2016/01/12 01:05 | 2016/01/12 03:09 | 124 | 6.811 | 11.703 | 3.405 | 2 |
| 2016/02/09 01:06 | 2016/02/09 03:11 | 125 | 5.922 | 8.480 | 2.961 | 2 |
| 2016/03/08 01:04 | 2016/03/08 03:06 | 122 | 6.522 | 11.631 | 3.61 | 2 |
| 2016/04/12 01:05 | 2016/04/12 03:03 | 118 | 5.484 | 8.371 | 2.742 | 2 |
| 2016/05/10 01:03 | 2016/05/10 02:59 | 116 | 5.986 | 11.497 | 2.993 | 2 |
| 2016/06/14 01:01 | 2016/06/14 03:05 | 124 | 5.349 | 8.337 | 2.675 | 2 |
| 2016/07/12 01:04 | 2016/07/12 02:59 | 115 | 6.206 | 11.552 | 3.103 | 2 |

FIG. 9

| Time-Series Data | Starting/Ending Times | Duration | Type | Maximum Amplitude | Average Value | Standard Deviation |
|---|---|---|---|---|---|---|
| A | 01:05 to 01:20 on Second Tuesday of Each Month | 15 Minutes | Upper Peak | 5.5 | 10.5 | 3.2 |
| A | ... | | | | | |
| B | | | | | | |
| C | | | | | | |
| D | | | | | | |
| E | | | | | | |
| ... | | | | | | |

FIG. 15

Event Waveform

|  | a | b | c | d | e | ... |
|---|---|---|---|---|---|---|
| Time-Series Data A | 1 | 1 | 0 | 0 | 0 | ... |
| Time-Series Data B | 0 | 1 | 0 | 1 | 0 | ... |
| Time-Series Data C | 1 | 1 | 0 | 1 | 0 | ... |
| Time-Series Data D | 0 | 1 | 0 | 0 | 0 | ... |
| Time-Series Data E | 1 | 0 | 1 | 0 | 0 | ... |
| ... | ... | ... | ... | ... | ... | ... |

TIME-SERIES DATA PROCESSING DEVICE, TIME-SERIES DATA PROCESSING SYSTEM, AND TIME-SERIES DATA PROCESSING METHOD

TECHNICAL FIELD

The present invention relates to a time-series data processing device, a time-series data processing system, and a time-series data processing method for processing a plurality of time-series data sequentially observed in subject equipment over time.

BACKGROUND ART

Control systems for controlling processes in plants have been used in power plants, chemical plants, iron and steel plants, water and sewerage plants, and the like, and control systems for controlling processes such as air conditioning, electricity, lighting, and water supply and drainage have also been used for equipment in buildings and factories.

In equipment of factories, automobiles, railroad vehicles, and the like, logging systems for recording the states of equipment included therein are often mounted. In a logging system, time-series data indicating the states of equipment over time observed by a sensor are accumulated.

In related art, changes in such time-series data have been analyzed for detection of abnormality of subject equipment. For example, there is an analysis method of comparing recent time-series data acquired from subject equipment with time-series data acquired previously when the subject equipment was in normal operation, to detect, as candidates for abnormality, partial string data whose behavior is different from that of the previous time-series data in the recent time-series data. Note that partial string data that are different from normal behavior in time-series data will be referred to as an "outlier", and a phenomenon related to actual failure of equipment will be referred to as "abnormality".

The analysis method of the related art just detects an "outlier" that does not match with previous values of time-series data handled as a string of numerical values, and the detected "outlier" thus does not necessarily relate to actual failure of equipment.

In contrast, an abnormality detecting system described in Patent Literature 1, for example, combines the outlier detection performed on time-series data and analysis performed on event information to determine an outlier related to failure of equipment as abnormality. Event information is information related to an event such as a worker's operation on equipment, a warning (which does not lead to shut-down of equipment) given by equipment, failure (which leads to shut-down of equipment), or periodic inspection. In the abnormality determination in combination with analysis of event information, it is determined whether or not an outlier relates to actual failure of equipment on the basis of such a condition as "an outlier detected from time-series data in synchronization with a specific event does not correspond to abnormality", for example.

CITATION LIST

Patent Literature

Patent Literature 1: JP 2013-218725 A

SUMMARY OF INVENTION

Technical Problem

Because the analysis in combination with the detection of an outlier of time-series data cannot be performed unless an event having occurred in subject equipment is identified, the technology of the related art mentioned with reference to Patent Literature 1 is on the assumption that information identifying an event in subject equipment is provided.

Such information is, for example, data that are "0" when no event occurs or when subject equipment is stopped, or "1" when an event has occurred or when subject equipment is in operation. In addition, the information may be log data in which the starting time and the ending time of an event are recorded, or data indicating inspection, cleaning, and repair schedules recorded in an electronically readable manner.

Depending on the configuration of subject equipment, however, such information is often not provided, or even if it is provided, it is often recorded on a print medium that is difficult to be electronically processed.

In this case, there is a problem in that data processing using event information cannot be performed.

The present invention has been made to solve the aforementioned problems, and an object thereof is to provide a time-series data processing device, a time-series data processing system, and a time-series data processing method capable of acquiring event information identifying an event in subject equipment.

Solution to Problem

A time-series data processing device according to the present invention includes an event waveform extracting unit, a co-occurrence rate calculating unit, a grouping unit, and an event information generating unit. The event waveform extracting unit extracts waveform data estimated to be changed because of an event having occurred in subject equipment, from each of a plurality of time-series data sequentially observed over time from the subject equipment. The co-occurrence rate calculating unit calculates a co-occurrence rate of the waveform data extracted by the event waveform extracting unit among time-series data. The grouping unit classifies time-series data into groups depending on the co-occurrence rate of the waveform data calculated by the co-occurrence rate calculating unit. The event information generating unit determines time at which periods of occurrence of the waveform data overlap with each other among the time-series data included in a group into which the time-series data are classified by the grouping unit, and generates event information identifying an event related to the waveform data on the basis of the determined time.

Advantageous Effects of Invention

According to the present invention, even when information identifying an event in subject equipment is not provided, event information can be obtained with use of time-series data observed in the subject equipment.

BRIEF DESCRIPTION OF DRAWINGS

FIG. 3 is a flowchart illustrating operation of the time-series data processing device according to the first embodiment.

FIG. 6 is a table illustrating an example of information output by an event waveform extracting unit.

FIG. 9 is a table illustrating an example of event information.

FIG. 15 is a table illustrating an example of information output by a co-occurrence rate calculating unit in the third embodiment.

DESCRIPTION OF EMBODIMENTS

Embodiments for carrying out the invention will now be described with reference to the accompanying drawings for more detailed explanation of the invention.

First Embodiment

Figure 1:
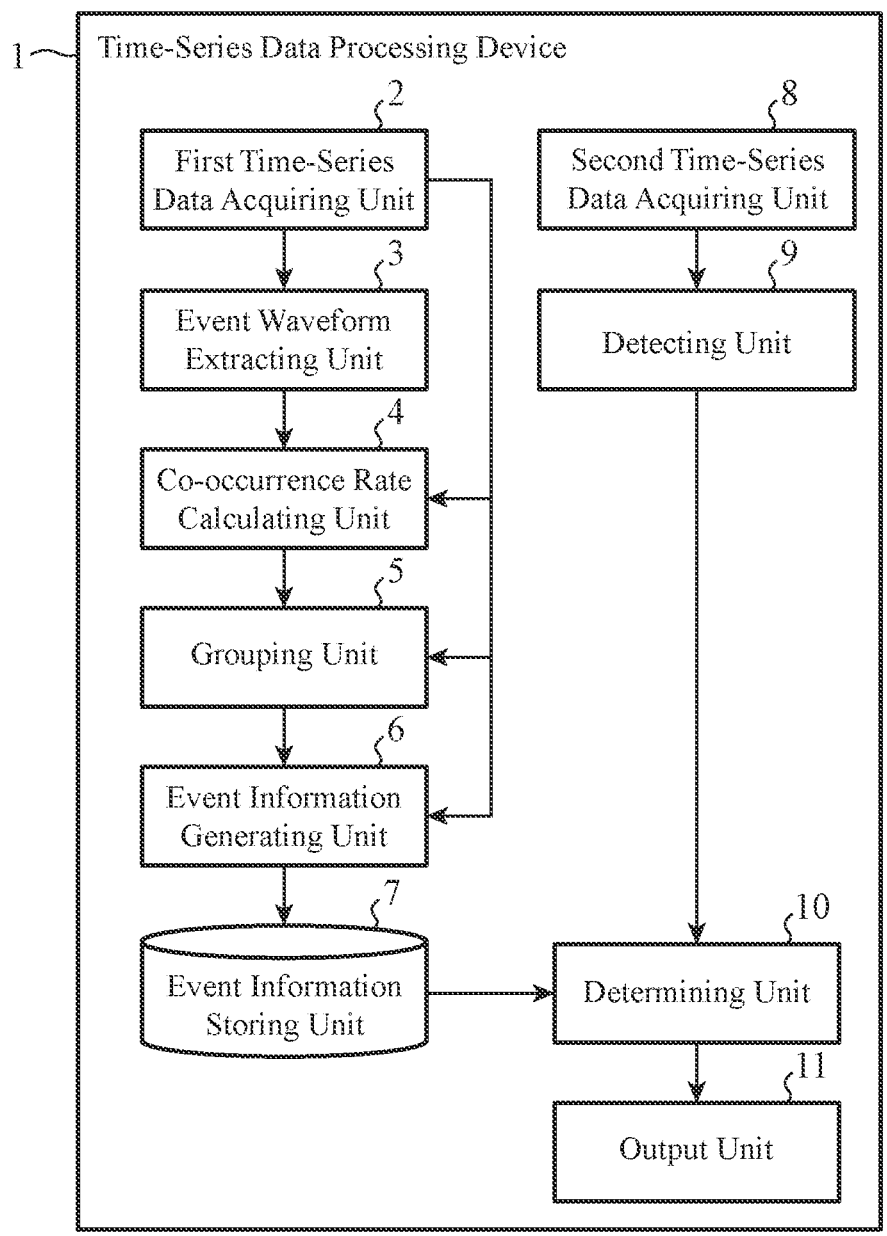
FIG. 1 is a block diagram illustrating a configuration of a time-series data processing device according to a first embodiment of the present invention.

FIG. 1 is a block diagram illustrating a configuration of a time-series data processing device 1 according to a first embodiment of the present invention. As illustrated in FIG. 1, the time-series data processing device 1 includes, as a configuration for generating event information, a first time-series data acquiring unit 2, an event waveform extracting unit 3, a co-occurrence rate calculating unit 4, a grouping unit 5, an event information generating unit 6, and an event information storing unit 7.

The time-series data processing device 1 also includes, as a configuration for detecting abnormality of subject equipment by using event information, a second time-series data acquiring unit 8, a detecting unit 9, a determining unit 10, and an output unit 11.

Time-series data are strings of sensor data indicating states of subject equipment that are sequentially observed over time by sensors. Examples of the subject equipment include equipment in a plant such as a power plant, a chemical plant, or a water and sewerage plant, air conditioning equipment, electrical equipment, lighting equipment, and plumbing equipment in a building or a factory. Furthermore, the subject equipment may be equipment in a production line of a factory, or equipment of an automobile or a railroad vehicle, or may be equipment of an information system related to economics or management.

Time-series data are stored in a control system that controls processes of the subject equipment.

The first time-series data acquiring unit 2 acquires a plurality of time-series data accumulated in the control system. The time-series data acquired by the first time-series data acquiring unit 2 are time-series data that were previously observed by a sensor provided in the subject equipment and accumulated.

Note that the previous time-series data accumulated in the control system may include time-series data whose data values are changed owing to abnormality in addition to time-series data whose data values are changed as a result of an event.

Furthermore, the first time-series data acquiring unit 2 acquires parameters to be used for generation of event information from the control system. Examples of the parameters include a threshold to be used for grouping of time-series data, a threshold to be used for determining an event condition from time-series data in a group and an event waveform, and the like, which will be described later.

The event waveform extracting unit 3 extracts an event waveform from each of the time-series data acquired by the first time-series data acquiring unit 2.

Note that an event waveform is waveform data (partial string data) in time-series data, which are expected to be changed by an event occurred in the subject equipment.

For example, the event waveform extracting unit 3 extracts partial string data whose values are continuously increasing or decreasing in time-series data. At the point when the partial string data are extracted by the event waveform extracting unit 3, it is unclear whether the change in the partial string data is caused by an event or abnormality. In the description below, for convenience, waveform data extracted by the event waveform extracting unit 3 will be referred to as an event waveform.

The co-occurrence rate calculating unit 4 calculates co-occurrence rates of event waveforms among time-series data extracted by the event waveform extracting unit 3. The co-occurrence rate of an event waveform represents the degree to which an event waveform co-occurs among time-series data. The co-occurrence rate calculating unit 4 calculates the co-occurrence rates of event waveforms among time-series data for all combinations from all the time-series data acquired by the first time-series data acquiring unit 2, and outputs a list of calculation results.

The grouping unit 5 classifies the time-series data into groups depending on the co-occurrence rates of the event waveforms calculated by the co-occurrence rate calculating unit 4. For example, the grouping unit 5 generates an adjacency matrix on the basis of results of comparing the co-occurrence rates calculated by the co-occurrence rate calculating unit 4 with a threshold, and classifies the time-series data by using the adjacency matrix so that time-series data in which event waveforms occur at similar timings are classified in the same group.

The event information generating unit 6 determines the time at which the periods during which event waveforms occur overlap with each other among the time-series data included in each group classified by the grouping unit 5, and generates event information on the basis of the determined time. Event information is information including an event condition that identifies an event related to the event waveform. For example, event information includes the starting time and the ending time of an event, the duration of an event waveform, descriptive statistics of the event waveform, the maximum amplitude and the frequency of the event waveform, and the type and the band model of the event waveform. The descriptive statistics of an event waveform are statistics describing characteristics of data constituting the event waveform, and examples thereof include an average value, a standard deviation, and a data range.

The event information storing unit 7 stores event information generated by the event information generating unit 6. The event information storing unit 7 stores an identifier of time-series data from which an event waveform is extracted, and event information for identifying an event related to the event waveform, in association with each other.

The second time-series data acquiring unit 8 acquires a plurality of time-series data from the control system of the subject equipment. The subject equipment is the same as that from which the first time-series data acquiring unit 2 acquired time-series data, but the second time-series data acquiring unit 8 acquires time-series data observed by the sensor provided in the subject equipment when determining abnormality of the subject equipment.

Furthermore, the second time-series data acquiring unit 8 acquires parameters to be used for abnormality detection from the control system. Examples of the parameters include a threshold to be used for outlier detection of time-series data.

The detecting unit 9 detects outlier data that are partial string data falling within an abnormality range from the time-series data acquired by the second time-series data acquiring unit 8. For example, the detecting unit 9 detects partial string data that fall within the abnormality range by using the parameter values acquired by the second time-series data acquiring unit 8.

Note that an example of a detection algorithm is described in Reference 1, but any method, other than that described in Reference 1, capable of determining the starting time and the ending time of outliers of time-series data may be used.

Reference 1: V Chandola, D. Cheboli, and V Kumar, "Detecting Anomalies in a Time Series Database", Dept. of Computer Science and Engineering, Univ. of Minnesota Technical Report, TR 09-004 (2009).

The determining unit 10 determines abnormality of the subject equipment on the basis of the outlier data detected by the detecting unit 9 and the event information generated by the event information generating unit 6.

For example, the determining unit 10 reads, from the event information storing unit 7, event information associated with the time-series data from which outlier data are detected, and compares the event condition indicated by the read event information with characteristic information of the outlier data. The determining unit 10 determines that the subject equipment has an abnormality when the characteristics of the outlier data do not match with the event condition, or determines that the subject equipment has no abnormality when the characteristics of the outlier data match with the event condition.

The output unit 11 outputs the result of abnormality determination performed by the determining unit 10. For example, the output unit 11 may provide a visual output on a display connected with the time-series data processing device 1 or may provide an auditory output from a loudspeaker connected with the time-series data processing device 1.

While the time-series data processing device 1 that includes both of a configuration for generating event information and a configuration for detecting abnormality of the subject equipment by using event information is illustrated in FIG. 1, these configuration may be included in separate devices.

For example, the time-series data processing device 1 may include the configuration for generating event information, and an abnormality detecting device provided separately from the time-series data processing device 1 may include the configuration for detecting abnormality. Thus, the first embodiment also includes a time-series data processing system including the time-series data processing device 1 and the abnormality detecting device.

In addition, while a case in which the event information storing unit 7 is a component of the time-series data processing device 1 is illustrated in FIG. 1, the event information storing unit 7 may alternatively be a component of a storage device provided separately from the time-series data processing device 1. In this configuration, the event information generating unit 6 of the time-series data processing device 1 outputs event information to the storage device so that the event information is stored in the event information storing unit 7. In addition, the determining unit 10 of the time-series data processing device 1 accesses the event information storing unit 7 of the storage device to read the event information.

Figure 2A:
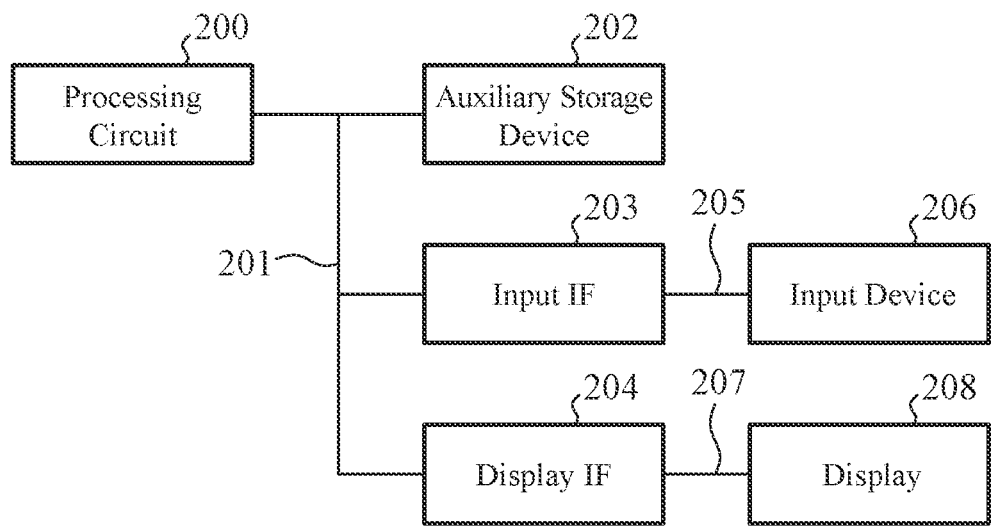
FIG. 2A is a block diagram illustrating a hardware configuration for implementing the functions of the time-series data processing device according to the first embodiment.
Figure 2B:
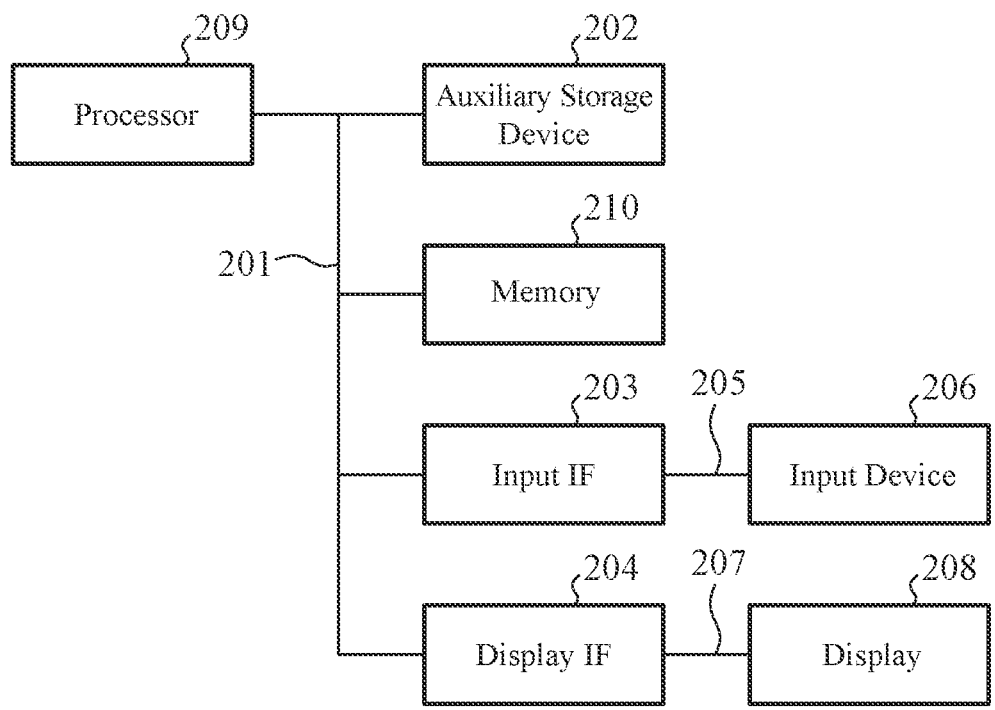
FIG. 2B is a block diagram illustrating a hardware configuration for executing software for implementing the functions of the time-series data processing device according to the first embodiment.

FIG. 2A is a block diagram illustrating a hardware configuration for implementing the functions of the time-series data processing device 1. In FIG. 2A, a processing circuit 200 is connected with an auxiliary storage device 202, an input interface (hereinafter, interface will be referred to as IF) 203, and a display IF 204 via signal lines 201, and the input IF 203 is connected with an input device 206 via a cable 205. The display IF 204 is connected with a display 208 via a cable 207. FIG. 2B is a block diagram illustrating a hardware configuration for executing software for implementing the functions of the time-series data processing device 1. In FIG. 2B, a processor 209 is connected with an auxiliary storage device 202, an input IF 203, a display IF 204, and a memory 210 via the signal lines 201.

The event information storing unit 7 may be included in the auxiliary storage device 202 illustrated in FIGS. 2A and 2B, and temporarily store time-series data and parameters acquired by the first time-series data acquiring unit 2 and the second time-series data acquiring unit 8.

The input device 206 is a device that receives input of information, and the received input information is stored in the auxiliary storage device 202 via the input IF 203.

The first time-series data acquiring unit 2 and the second time-series data acquiring unit 8 illustrated in FIG. 1 have a function of storing, in the auxiliary storage device 202, the information received by the input device 206 from the control system of the subject equipment.

The display 208 receives input of information via the display IF 204, and displays the input information. The output unit 11 illustrated in FIG. 1 has a function of displaying, on the display 208, a result of abnormality determination performed by the determining unit 10.

The functions of the first time-series data acquiring unit 2, the event waveform extracting unit 3, the co-occurrence rate calculating unit 4, the grouping unit 5, the event information generating unit 6, the event information storing unit 7, the second time-series data acquiring unit 8, the detecting unit 9, the determining unit 10, and the output unit 11 in the time-series data processing device 1 are implemented by the processing circuit. Specifically, the time-series data processing device 1 includes a processing circuit for performing processes from step ST1 to step ST7 illustrated in FIG. 3. The processing circuit may be dedicated hardware, or a central processing unit (CPU) for executing programs stored in a memory.

In a case where the processing circuit is dedicated hardware illustrated in FIG. 2A, the processing circuit 200 may be a single circuit, a composite circuit, a programmed processor, a parallel-programmed processor, an application specific integrated circuit (ASIC), a field-programmable gate array (FPGA), or a combination thereof, for example.

The individual functions of the first time-series data acquiring unit 2, the event waveform extracting unit 3, the co-occurrence rate calculating unit 4, the grouping unit 5, the event information generating unit 6, the event information storing unit 7, the second time-series data acquiring unit 8, the detecting unit 9, the determining unit 10, and the output unit 11 may be implemented by separate processing circuits, or may be collectively implemented by a single processing circuit.

In a case where the processing circuit is the processor 209 illustrated in FIG. 2B, the functions of the first time-series data acquiring unit 2, the event waveform extracting unit 3, the co-occurrence rate calculating unit 4, the grouping unit 5, the event information generating unit 6, the event information storing unit 7, the second time-series data acquiring unit 8, the detecting unit 9, the determining unit 10, and the output unit 11 are implemented by software, firmware, or a combination of software and firmware. The software or firmware is described in the form of programs and stored in the memory 210.

The processor 209 implements the functions of the individual units by reading and executing the programs stored in the memory 210. Thus, the time-series data processing device 1 includes the memory 210 for storing programs, which, when executed by the processor 209, results in execution of the processes from step ST1 to step ST7 illustrated in FIG. 3. These programs cause a computer to perform procedures or methods of the first time-series data acquiring unit 2, the event waveform extracting unit 3, the co-occurrence rate calculating unit 4, the grouping unit 5, the event information generating unit 6, the event information storing unit 7, the second time-series data acquiring unit 8, the detecting unit 9, the determining unit 10, and the output unit 11.

The memory 210 may be a nonvolatile or volatile semiconductor memory such as a random access memory (RAM), a read only memory (ROM), a flash memory, an erasable programmable read only memory (EPROM), or an electrically-EPROM (EEPROM); a magnetic disk, a flexible disk, an optical disk, a compact disc, a mini disc, or a DVD, for example.

Some of the functions of the first time-series data acquiring unit 2, the event waveform extracting unit 3, the co-occurrence rate calculating unit 4, the grouping unit 5, the event information generating unit 6, the event information storing unit 7, the second time-series data acquiring unit 8, the detecting unit 9, the determining unit 10, and the output unit 11 may be implemented by dedicated hardware and others may be implemented by software or firmware.

For example, the functions of the first time-series data acquiring unit 2, the event waveform extracting unit 3, the co-occurrence rate calculating unit 4, the grouping unit 5, the event information generating unit 6, and the event information storing unit 7 may be implemented by a processing circuit that is dedicated hardware, and the functions of the second time-series data acquiring unit 8, the detecting unit 9, the determining unit 10, and the output unit 11 may be implemented by the processor 209 by reading and executing programs stored in the memory 210.

As described above, the processing circuit is capable of implementing the individual functions by hardware, software, firmware, or a combination thereof.

Next, the operation will be explained.

FIG. 3 is a flowchart illustrating the operation of the time-series data processing device 1, in which a series of processes from acquisition of time-series data to generation of event information is illustrated.

The first time-series data acquiring unit 2 acquires time-series data and parameters (step ST1). The first time-series data acquiring unit 2 acquires time-series data previously observed by the sensor provided in the subject equipment and accumulated in the control system, and acquires parameters to be used for generating event information.

Subsequently, the event waveform extracting unit 3 inputs a plurality of time-series data acquired by the first time-series data acquiring unit 2, and extracts event waveforms from the input time-series data (step ST2). An event waveform is partial string data of time-series data that are changed by an event having occurred in the subject equipment, and examples thereof include data of air pressure that changes with sealing and opening of a vacuum vessel, and data of vibration caused by pipe cleaning.

Examples of the pattern of change of partial string data constituting an event waveform include (A) to (D) below. The event waveform extracting unit 3 is capable of accurately extracting an event waveform from time-series data on the basis of these change patterns.

(A) A change pattern in which the data value suddenly increases or decreases.

(B) A change pattern in which a sudden increase and a sudden decrease of the data value are repeated with peaks.

(C) A square wave type change pattern in which the data value suddenly increases or decreases, then changes by small amounts, and then suddenly increases or decreases again.

(D) A vibration type change pattern in which an increase and a decrease are repeated with a constant amplitude.

Event waveforms may occur in accordance with a rule.

Examples of the rule include a rule in units of a day such as "for ten minutes from midnight every day", a rule of time and day on the calendar such as "8 PM on the second Friday of every month" (a rule that varies between four and five weeks), and a rule of the operation status such as "each time 1,000 products are manufactured". In addition, the timing at which an event waveform occurs may change depending on the operating day of the subject equipment, the schedules of workers or working machinery, the suddenness of an event, and the like.

Figure 4:
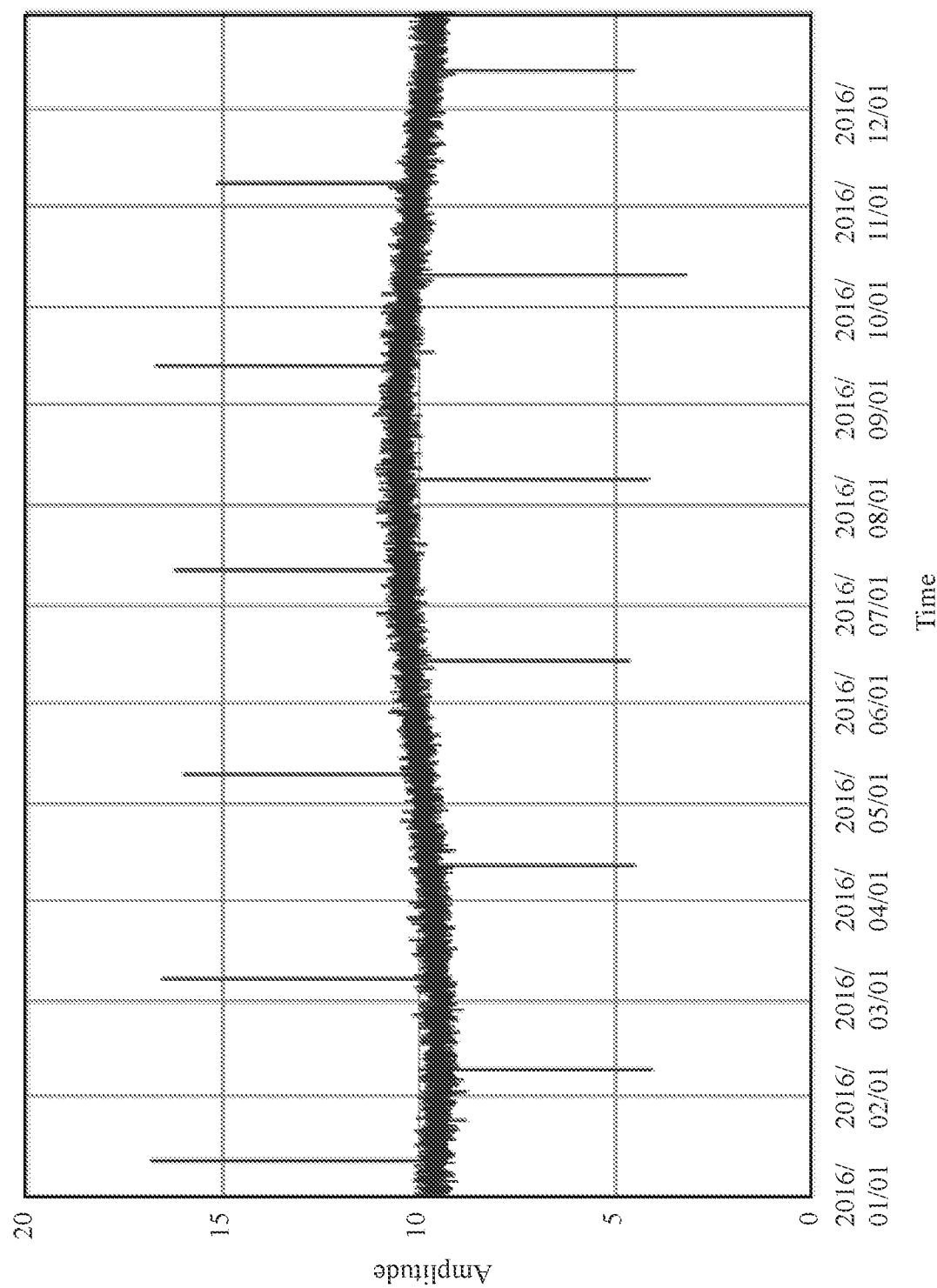
FIG. 4 is a graph illustrating an example of time-series data.

FIG. 4 is a graph illustrating an example of time-series data, in which time-series data that are observed from subject equipment throughout a year are illustrated. The time-series data illustrated in FIG. 4 repeat a gradual increase and a gradual decrease while vibrating throughout the year, and have event waveforms of upper and lower peaks with an amplitude of 5 or larger that occurred in the first half of each month.

Figure 5:
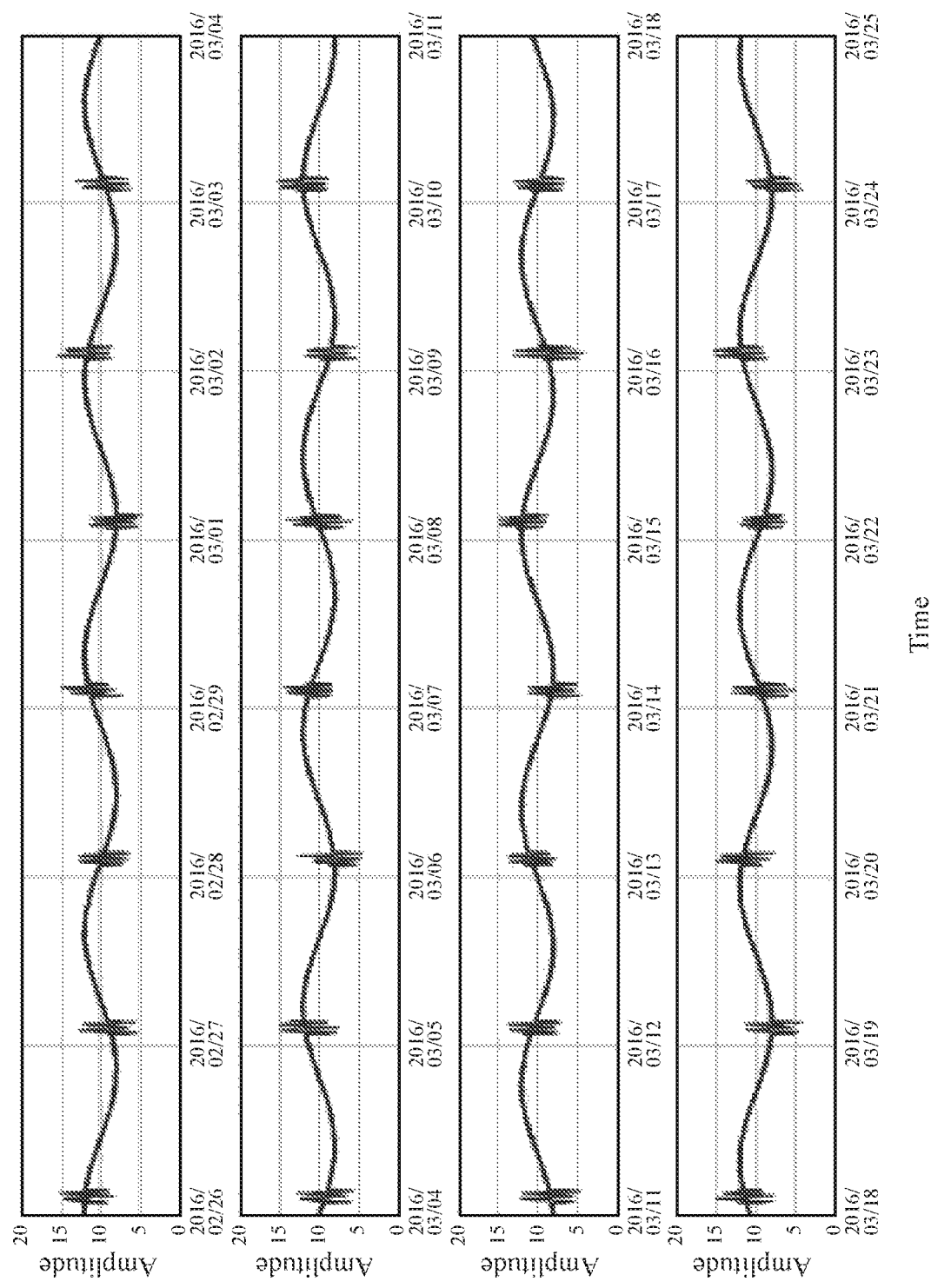
FIG. 5 is a graph illustrating another example of time-series data.

FIG. 5 is a graph illustrating another example of time-series data, in which time-series data observed from subject equipment every day are illustrated for each week. The time-series data illustrated in FIG. 5 repeat a gradual increase and a gradual decrease, and have vibration waveforms with an amplitude of 5 to 6 as event waveforms that occurred in the first half of each day.

The event waveform extracting unit 3 performs leg vibration analysis described in Reference 2, for example, on time-series data to extract event waveforms.

According to leg vibration analysis, "a sudden increase or a sudden decrease of the data value" in the time-series data is extracted as an increasing leg or a decreasing leg with a frequency of 1. A peak of the time-series data is extracted as a leg vibration path with a frequency of 2 or −2. A vibration waveform of the time-series data is extracted as a leg vibration path with a frequency of 3 or higher when the vibration waveform starts from an increasing leg, or extracted as a leg vibration path with a frequency of −3 or lower when the vibration waveform starts from a decreasing leg.

Reference 2: Makoto Imamura, Takaaki Nakamura, Hideya Shibata, Norio Hirai, Shinji Kitagami, and Tatsuji Munaka, "Leg Vibration Analysis for Time Series", Journal of Information Processing Society of Japan, vol. 57, No. 4, pp. 1303-1318 (2016).

The event waveform extracting unit 3 generates list information including the starting time and the ending time of each event waveform (hereinafter referred to as event waveform list information) for each of the time-series data, and outputs the generated event waveform list information to the co-occurrence rate calculating unit 4.

Note that records in the event waveform list information may include the types of the event waveforms, the durations of the event waveforms, and the descriptive statistics of the event waveforms. Examples of the types of event waveforms include a peak type in which a peak occurs and a vibration type in which a vibration waveform occurs.

FIG. 6 is a table illustrating an example of information output by the event waveform extracting unit 3, in which specific contents of event waveform list information are illustrated. The list information illustrated in FIG. 6 includes, in addition to the starting times and the ending times of event waveforms, the durations of the event waveforms, the maximum amplitudes, averages, and standard deviations, which are descriptive statistics, and the frequencies thereof.

The description refers back to FIG. 3.

The event waveform extracting unit 3 checks whether or not the process of extracting event waveforms from time-series data have been performed on all the time-series data acquired by the first time-series data acquiring unit 2 (step ST3). If unprocessed time-series data are present (step ST3; NO), the operation returns to step ST2 and the process described above is repeated.

If no unprocessed time-series data are present (step ST3; YES), the event waveform extracting unit 3 outputs the event waveform list information to the co-occurrence rate calculating unit 4.

The co-occurrence rate calculating unit 4 calculates the co-occurrence rates of event waveforms among time-series data for all combinations from all the time-series data acquired by the first time-series data acquiring unit 2 on the basis of the event waveform list information (step ST4).

Note that the co-occurrence rate calculating unit 4 obtains the number of times event waveforms occurred at the same time among time-series data on the basis of the starting times and the ending times of event waveforms included in the event waveform list information, and calculates the co-occurrence rates by using the number of occurrences.

For example, in a case where time-series data A and time-series data B that are different from each other are present, the co-occurrence rates of event waveforms between the time-series data A and the time-series data B is calculated by formulas (1) to (3) below.

Note that, in formulas (1) to (3), the number of concurrences of event waveforms refers to the number of times event waveforms occurred at the same time between the time-series data A and the time-series data B.

In addition, a co-occurrence rate $C_A$ refers to a first co-occurrence rate indicating the degree to which an event waveform occurs in the time-series data B as a result of occurrence of an event waveform in the time-series data A.

A co-occurrence rate $C_B$ refers to a second co-occurrence rate indicating the degree to which an event waveform occurs in the time-series data A as a result of occurrence of an event waveform in the time-series data B.

A co-occurrence rate $C_{AB}$ refers to a third co-occurrence rate, which is a harmonic mean of the co-occurrence rate $C_A$ and the co-occurrence rate $C_B$.

The co-occurrence rate calculating unit 4 may output any of the co-occurrence rate $C_A$, the co-occurrence rate $C_B$, and the co-occurrence rate $C_{AB}$ as a final co-occurrence rate. In this manner, the degree to which event waveforms co-occur between time-series data is accurately determined.

$$C_A = \text{the number of concurrences of event waveforms/the number of event waveforms in time-series data } A \quad (1)$$

$$C_B = \text{the number of concurrences of event waveforms/the number of event waveforms in time-series data } B \quad (2)$$

$$C_{AB} = 2*C_A*C_B/(C_A+C_B) \quad (3)$$

Note that "occurrence of event waveforms at the same time" between the time-series data A and the time-series data B means that the period during which an event waveform occurs in the time-series data A and the period during which an event waveform occurs in the time-series data B overlap with each other.

Examples of the states in which the periods during which event waveforms occur overlap with each other include the following states (a) to (d).

(a) A state in which the period during which an event waveform occurs in the time-series data A and the period during which an event waveform occurs in the time-series data B completely overlap with each other.

(b) A state in which the period during which an event waveform occurs in the time-series data A and the period during which an event waveform occurs in the time-series data B overlap with each other by a %.

(c) A state in which the period during which an event waveform occurs in the time-series data A and the period during which an event waveform occurs in the time-series data B overlap with each other by data corresponding to one point.

(d) A state in which the difference between the ending time of an event waveform in one of the time-series data A and B and the starting time of an event waveform in the other is within p.

In a case where a change having occurred in time-series data propagates slowly before being observed by the sensor, the starting time or the ending time of the event waveform may be subjected to a time lag.

Thus, in a case where a time lag is likely to occur in relation to occurrence of an event waveform, the co-occurrence rate calculating unit 4 may select any one of the states (a) to (d) as a state on the basis of which concurrence of event waveforms is determined.

Figure 7:
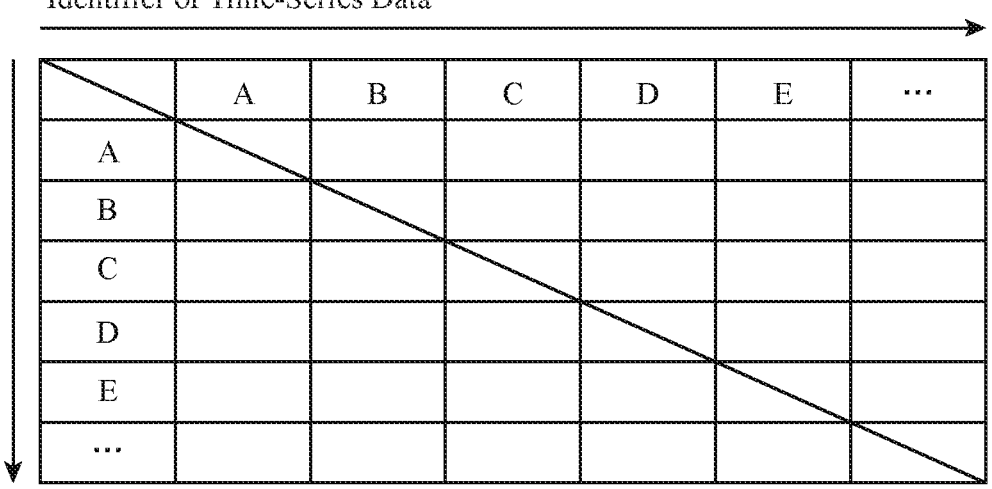
FIG. 7 is a table illustrating an example of information output by a co-occurrence rate calculating unit.

The co-occurrence rate calculating unit 4 calculates the co-occurrence rate of event waveforms in all time-series data for all combinations, and generates list information of the co-occurrence rates obtained as a result of the calculation (hereinafter referred to as co-occurrence rate list information). The co-occurrence rate list information is output by the co-occurrence rate calculating unit 4 to the grouping unit 5. FIG. 7 is a table illustrating an example of information output by the co-occurrence rate calculating unit 4, in which a specific example of the co-occurrence rate list information is illustrated. In the co-occurrence rate list information, a co-occurrence rate of event waveforms among time-series data is set in association with identifiers of time-series data from which the event waveforms are extracted. As illustrated in FIG. 7, the co-occurrence rate list information may be data in a form of a matrix including co-occurrence rates as elements.

The description refers back to FIG. 3.

The grouping unit 5 classifies the time-series data acquired by the first time-series data acquiring unit 2 on the basis of the co-occurrence rates in the co-occurrence rate list information so that time-series data in which event waveforms occur at similar timings are classified in the same group (step ST5).

For example, the grouping unit 5 compares a threshold $\gamma$ acquired by the first time-series data acquiring unit 2 with the co-occurrence rates in the co-occurrence rate list information, and generates an adjacency matrix in which elements with a co-occurrence rate equal to or higher than the threshold $\gamma$ are set to "1", and elements with a co-occurrence rate lower than the threshold $\gamma$ are set to "0".

Subsequently, the grouping unit 5 classifies the time-series data into groups by clustering using the adjacency matrix. For the clustering, such methods as k-means clustering, which regards one row of the adjacency matrix as a vector, spectral clustering using the adjacency matrix, or community detection that regards the adjacency matrix as a network structure constituted by nodes and edges can be used.

In addition, either of hard clustering, which does not allow overlap of time-series data between groups, and soft clustering, which allows the overlap, may be selected depending on the property of time-series data.

The grouping unit 5 generates list information in which the event waveform list information associating the identifier of time-series data with the identifier of the group in which the time-series data are classified (hereinafter referred to as group list information), and outputs the generated group list information to the event information generating unit 6.

Note that, as described above, the event waveform list information includes the starting times and the ending times of event waveforms generated by the event waveform extracting unit 3.

Subsequently, the event information generating unit 6 determines the time at which event waveforms occur at the same time among the time-series data included in each group, and generates event information identifying an event related to the event waveforms on the basis of the determined time (step ST6). The process in step ST6 is performed for each group by the event information generating unit 6.

Events are assumed to have regularity. One example of the regularity is that related to the timings at which event waveforms occur. Another example is the regularity of event waveforms themselves.

Event waveforms that occur in one time-series data as a result of an event having occurred in subject equipment are expected to be of the same type. For example, event waveforms in the time-series data A are of an upward peak type, while event waveforms in the time-series data B are of a vibration type.

The event information generating unit 6 determines the time at which event waveforms occur at the same time among time-series data included in each group on the basis of the group list information input from the grouping unit 5. Note that "event waveforms occur at the same time" refers to a state in which the periods during which event waveforms occur among the time-series data included in the group overlap with each other.

For example, the time at which event waveforms occur in all the time-series data included in the group may be determined, or the time at which event waveforms occur in $\delta$ % or more of the time-series data included in the group may be determined. Note that $\delta$ is a parameter acquired by the first time-series data acquiring unit 2.

The event information generating unit 6 generates histograms related to the time at which event waveform occur under a plurality of conditions such as "minute", "time", "date", and "day" on the basis of the determined time.

The time at which event waveforms occur at the same time may be expressed by the starting times of the event waveforms, the ending times thereof, the median times between the starting times and the ending times, or a combination thereof.

A bin with the maximum frequency in the thus generated histograms is likely to be the time at which an event related to event waveforms occurs.

Figure 8:
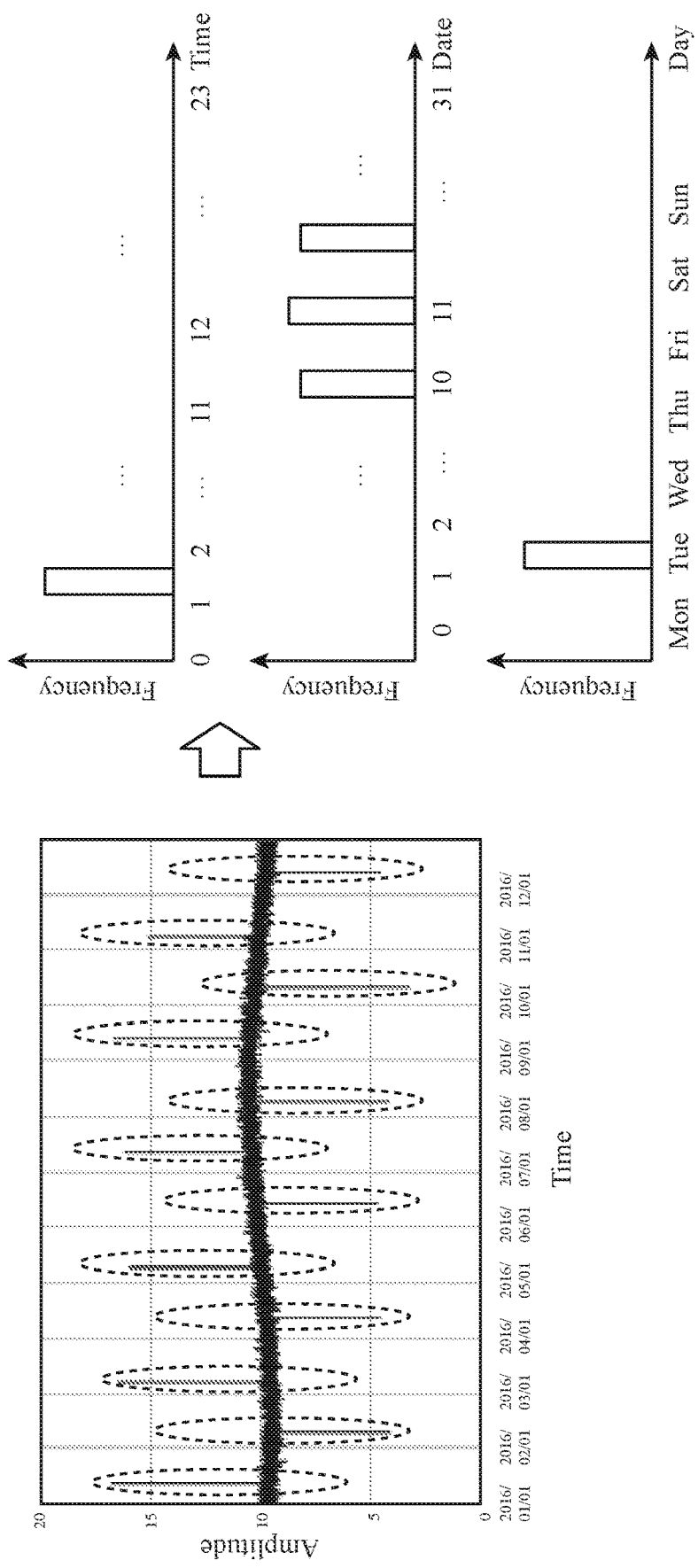
FIG. 8 is a diagram illustrating an outline of a process for identifying an event related to event waveforms.

FIG. 8 is a diagram illustrating an outline of a process of identifying an event related to event waveforms.

The event information generating unit 6 generates histograms related to the time at which event waveforms in time-series data illustrated on the left side of FIG. 8 occur under three conditions of "time", "date", and "day" illustrated on the right side of FIG. 8. Note that, in FIG. 8, the time at which event waveforms occur at the same time is expressed by the median times between the starting times and the ending times of the event waveforms.

In the histogram of "time" illustrated on the upper part on the right side of FIG. 8, the frequency is maximum at 1 AM. In addition, in the histogram of "date" illustrated on the middle part on the right of FIG. 8, nearly equal frequencies are observed around the 11th from the 8th to the 14th, and in the histogram of "day" illustrated on the lower part on the right side of FIG. 8, the frequency of a day corresponding to Tuesday is maximum.

The event information generating unit 6 estimates an event condition that an event related to event waveforms occur at "1 AM on the second Tuesday of each month" on the basis of analysis results of the histograms. In this manner, the time at which an event occurs is statistically estimated.

Subsequently, in a case where the event information generating unit 6 generates a histogram related to the starting times of event waveforms and a histogram related to the ending times thereof under the condition of "minute" and obtains the bin with the maximum frequency in each of the histograms, an event condition that the event "occurs from about 1:05 AM to 1:20 AM" can also be estimated, for example.

Furthermore, in a case where the event information generating unit 6 generates a histogram related to the types of event waveforms and obtains the bin with the maximum frequency therein, the types of event waveforms can also be estimated.

For example, the event information generating unit 6 generates a histogram related to the number of peaks surrounded by broken line in the time-series data illustrated on the left side of FIG. 8, and obtains the bin with the maximum frequency. In this case, if the frequency of upward peaks is equally as high as that of downward peaks, the type of the event waveform can be estimated as an upper or lower peak type.

While the cases where the bin with the maximum frequency is obtained in each histogram, bins with frequencies of the maximum frequency×ε % or higher may be obtained, which provides a range in the estimation of the event condition.

In addition, in a histogram in which the frequencies of ζ % or more of all the bins are the maximum frequency×η % or higher, the differences between the frequencies are not significant, which is not appropriate for estimation of the event condition. Thus, such a histogram need not be used for estimation of the event condition. The thresholds ε, ζ, and η are parameters acquired by the first time-series data acquiring unit 2.

The event information generating unit 6 stores, into the event information storing unit 7, the estimated event conditions as event information in association with the identifier of the time-series data. The event information may also include information included in the event waveform list information in addition to the starting time and the ending time of the event.

As described above, the event waveform list information is list information generated for each time-series data by the event waveform extracting unit 3 in step ST2, and also includes the types of event waveforms, the durations of the event waveforms, and the descriptive statistics of the event waveforms.

FIG. 9 is a table illustrating an example of event information, in which event information generated for each time-series data is illustrated. The event information illustrated in FIG. 9 includes, in addition to the starting time and the ending time of the event, the type of event waveforms and the descriptive statistics of the event waveforms. The descriptive statistics of the event waveforms include the durations of the event waveforms, the maximum amplitudes of the event waveforms, and the average values and the standard deviations of upward and downward variations of the event waveforms. In addition, the band models of the event waveforms as described in Reference 3 may be included. In this manner, an event is accurately identified on the basis of the event information.

Reference 3: WO 2016/116961 A1

The description refers back to FIG. 3.

After the process in step ST6 on one group is completed, the event information generating unit 6 checks whether or not the process has been performed on all the groups of the classification performed by the grouping unit 5 (step ST7).

If an unprocessed group is present (step ST7; NO), the event information generating unit 6 returns to step ST6 and performs the process on the next group.

If the process has been performed on all the groups (step ST7; YES), the processing in FIG. 3 is terminated.

Next, determination on abnormality of the subject equipment will be explained.

Figure 10:
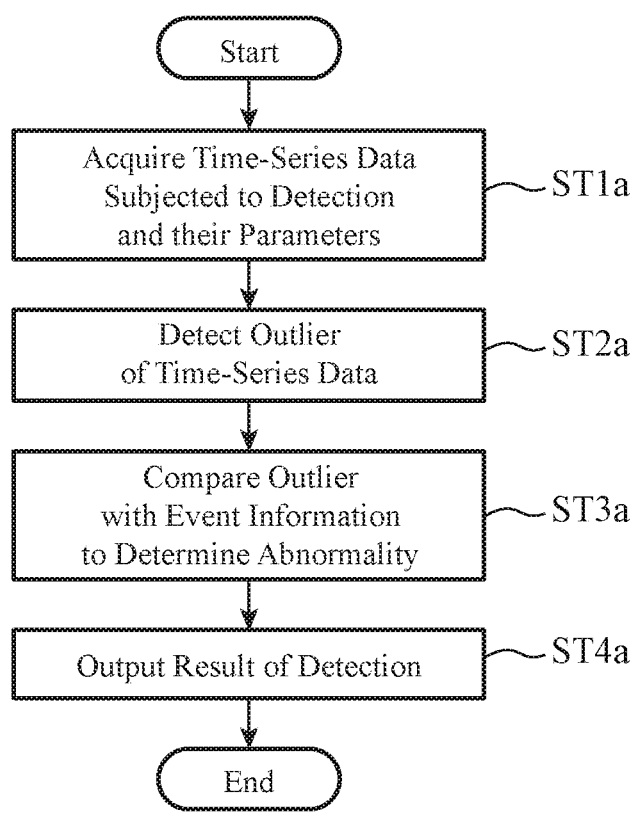
FIG. 10 is a flowchart illustrating an abnormality determination process.

FIG. 10 is a flowchart illustrating an abnormality determination process, in which a series of processes from acquisition of time-series data obtained in equipment subjected to abnormality detection to output of a result of abnormality detection are illustrated.

The second time-series data acquiring unit 8 acquires time-series data and parameters observed in equipment subjected to abnormality detection from a control system provided in the equipment (step ST1a). For example, the second time-series data acquiring unit 8 acquires time-series data observed by a sensor provided in the equipment and accumulated in the control system, and further acquires parameters to be used for abnormality detection.

Subsequently, the detecting unit 9 detects an outlier of time-series data (step ST2a).

For example, the detecting unit 9 detects, as the outlier, partial string data that fall within the abnormality range by using the parameter values acquired by the second time-series data acquiring unit 8. For the detection of an outlier, the method described in Reference 1 mentioned above may be used.

Subsequently, the determining unit 10 determines abnormality of the subject equipment on the basis of the outlier of the time-series data detected by the detecting unit 9 and the event information generated by the event information generating unit 6 (step ST3a). For example, the determining unit 10 reads the event information associated with the time-series data from which the outlier is detected from the event information storing unit 7. Subsequently, the determining unit 10 compares the starting time and the ending time of the outlier detected by the detecting unit 9, the type and the descriptive statistics of the data waveform, and the value of the data at every predetermined time with the starting time and the ending time of an event, the type of the event waveforms and the descriptive statistics of the event waveforms, and the band model included in the read event information. Note that all of the above may be compared, or only some data of the above may be compared. The determining unit 10 determines that abnormality is present in the subject equipment if the characteristics of the outlier are determined not to match with the event conditions as a result of the comparison, or determines that no abnormality is present in the subject equipment if the characteristics of the outlier match with the event condition.

The output unit 11 outputs the result of the abnormality determination of the determining unit 10 as a detection result (step ST4a). In this process, the output unit 11 outputs no result if the determining unit 10 determines that no abnormality is present in the subject equipment, or outputs an abnormality detection result if the determining unit 10 determines that abnormality is present in the subject equipment. The abnormality detection result is displayed on the display 208 illustrated in FIGS. 2A and 2B, for example.

As described above, the time-series data processing device 1 according to the first embodiment classifies time-series data into groups depending on the co-occurrence rates of event waveforms among time-series data, extracts event waveforms with periods during which the event waveforms occur, overlapping with each other among time-series data included in each group, and generates event information that identifies an event related to the extracted event waveforms.

This configuration enables event information to be obtained with use of time-series data observed in the subject equipment even when information identifying an event in the subject equipment is not provided.

The time-series data processing device 1 according to the first embodiment includes the detecting unit 9 and the determining unit 10. The detecting unit 9 detects outlier data from time-series data. The determining unit 10 determines abnormality of subject equipment on the basis of outlier data and event information. This configuration enables abnormality detection combining outlier detection from time-series data and analysis of event information, which improves the accuracy of abnormality detection.

In the time-series data processing device 1 according to the first embodiment, the event waveform extracting unit 3 extracts event waveforms on the basis of a combination of partial string data whose values continuously increase or decrease in time-series data. This enables accurate extraction of event waveforms from time-series data.

In the time-series data processing device 1 according to the first embodiment, the event information generating unit 6 generates event information on the basis of the starting times and the ending times of event waveforms, the durations of the event waveforms, the descriptive statistics of the event waveforms, the maximum amplitudes and the frequencies of the event waveforms, and the types of the event waveforms. This enables an event to be accurately identified on the basis of the event information.

In the time-series data processing device 1 according to the first embodiment, the co-occurrence rate calculating unit 4 calculates any of the co-occurrence rate $C_A$ calculated according to formula (1), the co-occurrence rate $C_B$ calculated according to formula (2), and the co-occurrence rate $C_{AB}$ calculated according to formula (3). This enables the degree to which event waveforms co-occur among time-series data to be accurately determined.

In the time-series data processing device 1 according to the first embodiment, the event information generating unit 6 calculates a histogram on the times at which event waveforms occur in time-series data, and estimates the time of the bin with the maximum frequency in the histogram as the time at which an event related to the event waveforms occurs. This enables the time at which an event occurs to be accurately estimated.

In the time-series data processing device 1 according to the first embodiment, the event information generating unit 6 generates event information including the starting time and the ending time of an event, or generates event information including, in addition to the starting time and the ending time of an event, at least one of the durations of event waveforms, the descriptive statistics of the event waveforms, the maximum amplitudes and the frequencies of the event waveforms, the types of the event waveforms, and the band model. This enables an event to be accurately identified on the basis of the event information.

Second Embodiment

While an event identified by event information obtained in the first embodiment is an event statistically estimated from time-series data, information used for generation of event information can be edited in a second embodiment. This enables determination on event conditions made by a person with specialized knowledge on subject equipment to be reflected in event information, and an event occurring in the subject equipment to be identified with high accuracy, for example.

Figure 11:
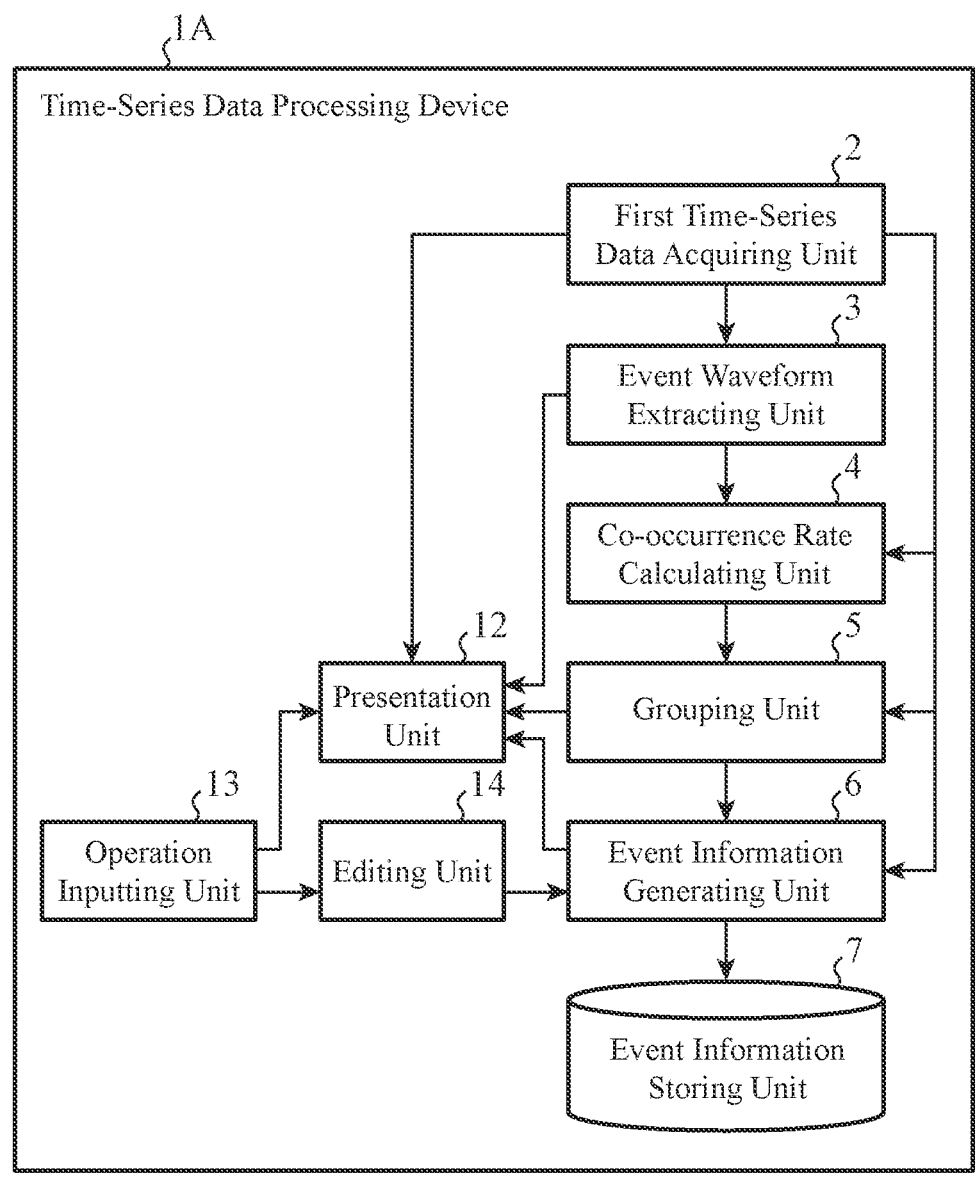
FIG. 11 is a block diagram illustrating a configuration of a time-series data processing device according to a second embodiment of the present invention.

FIG. 11 is a block diagram illustrating a configuration of a time-series data processing device 1A according to the second embodiment of the present invention. In FIG. 11, components that are the same as those in FIG. 1 are designated by the same reference numerals, and the description thereof will not be repeated. Note that the time-series data processing device 1A is characterized in the configuration for generating event information, and FIG. 11 does not therefore illustrate the second time-series data acquiring unit 8, the detecting unit 9, the determining unit 10, and the output unit 11, which constitute the configuration for abnormality detection.

The time-series data processing device 1A includes, in addition to the configuration presented in the first embodiment, a presentation unit 12, an operation inputting unit 13, and an editing unit 14.

The presentation unit 12 presents information on event waveforms included in each of the groups of the classification performed by the grouping unit 5. Note that information on event waveforms refers to the group list information presented in the first embodiment.

For example, the presentation unit 12 displays an information editing screen on which information included in the group list information is described on the display 208 illustrated in FIGS. 2A and 2B.

Examples of the information presented by the presentation unit 12 include a list of the groups, a list of time-series data included in each of the groups, graphs of time-series data, a list of event waveforms included in each of time-series data, histograms related to the times of occurrence of event waveforms, and the band model.

The operation inputting unit 13 receives operation on the presentation of the presentation unit 12.

For example, the operation inputting unit 13 receives operation on the information presented by the presentation unit 12 using the input device 206 illustrated in FIGS. 2A and 2B, and outputs a signal representing the operation to the editing unit 14. In this manner, the presentation unit 12 and the operation inputting unit 13 provide a graphical user interface (hereinafter abbreviated as GUI) for editing information.

The editing unit 14 edits information presented by the presentation unit 12 on the basis of the operation received by the operation inputting unit 13.

For example, in a case where a list of time-series data included in each group is presented by the presentation unit 12 and an operation to delete time-series data is received by the operation inputting unit 13, the editing unit 14 deletes the corresponding time-series data from the list. In this manner, group list information used for generation of event information is edited.

Figure 12:
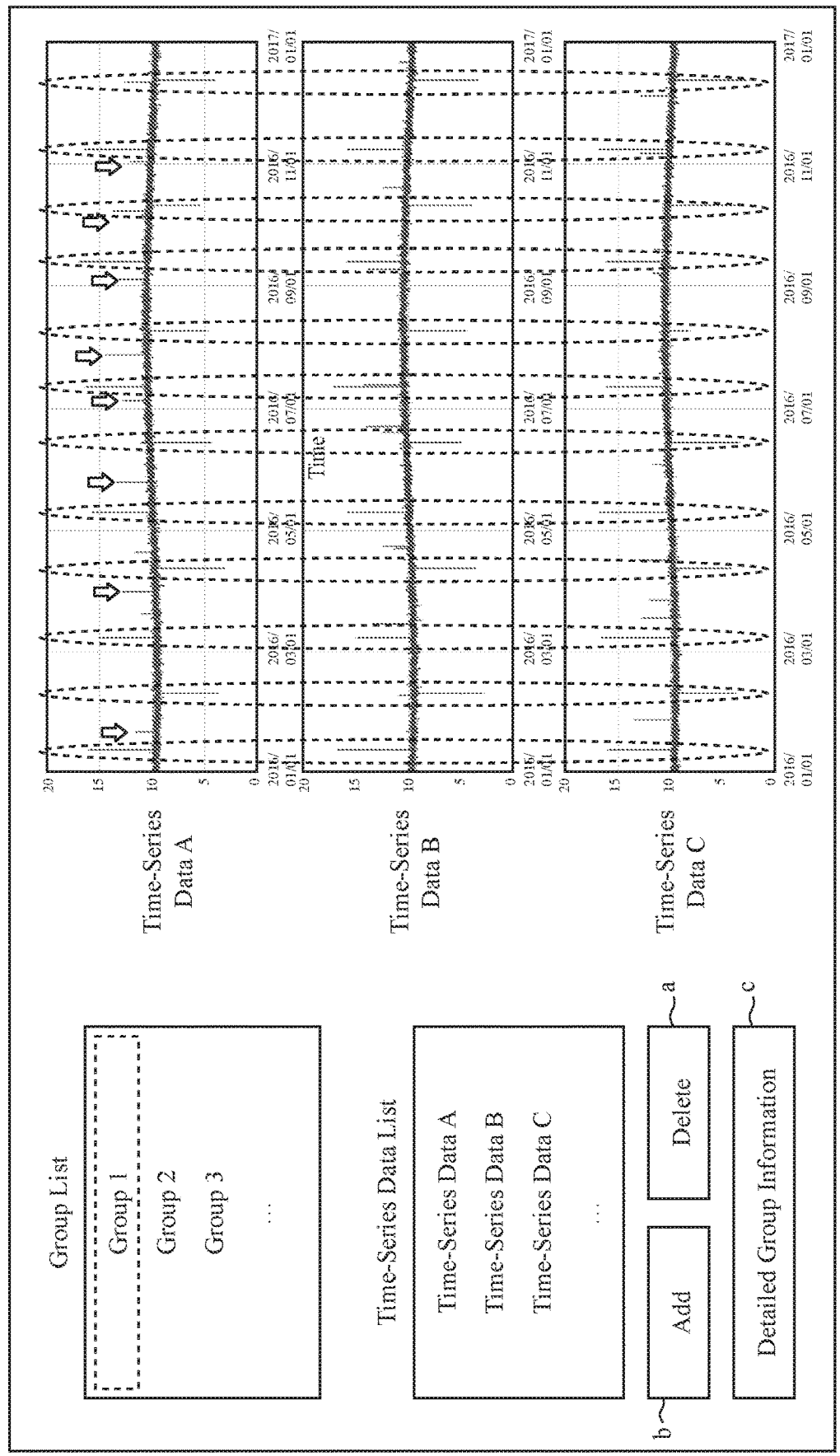
FIG. 12 is a diagram illustrating an example of an information editing screen.

FIG. 12 is a diagram illustrating an example of an information editing screen presented by the presentation unit 12. The screen illustrated in FIG. 12 includes a list of groups of the classification performed by the grouping unit 5, a list of time-series data included in the group selected from the list of groups, and graphs of the time-series data.

For example, the presentation unit 12 generates and presents an information editing screen illustrated in FIG. 12 on the basis of the group list information. The group list information is information in which information on an event waveform associated with an identifier of time-series data is associated with the identifier of the group in which the time-series data is classified, as described in the first embodiment.

When "Group 1" is selected from the list of groups with use of the input device 206, the operation inputting unit 13 outputs a signal representing the selecting operation to the presentation unit 12. The presentation unit 12 displays the time-series data A to C included in the "Group 1" and further displays graphs of waveforms of the time-series data A to C on the basis of the signal input from the operation inputting unit 13. This enables the user to check the time-series data classified in each group.

The presentation unit 12 may highlight the event waveforms extracted by the event waveform extracting unit 3 and the event waveforms occurring at the same time among the time-series data included in the group in the graphs of the time-series data included in the group. In the example of FIG. 12, waveforms (peaks) indicated by arrows in the graph of the time-series data A do not occur in the time-series data B and C, and are thus event waveforms that do not occur at the same time among the time-series data. In contrast, the peaks enclosed by broken lines are event waveforms occurring at the same time in the time-series data A to C.

Such highlighting as enclosing with broken lines facilitates visual recognition of the event waveforms occurring at the same time in the time-series data A to C.

The presentation unit 12 displays a button a for deletion of information, a button b for addition of information, and a button c for detailed group information in the information editing screen.

For example, when a group in the list of groups or time-series data in the list of time-series data is selected and the button a for deletion is then pressed with use of the input device 206, the operation inputting unit 13 outputs a signal representing this operation to the presentation unit 12 and the editing unit 14.

The presentation unit 12 deletes the selected group or the selected time-series data in the information editing screen on the basis of the signal input from the operation inputting unit 13. When time-series data is deleted, the graph of the time-series data is also deleted.

The editing unit 14 deletes the selected group from the groups of the classification performed by the grouping unit 5 or deletes the selected time-series data from the time-series data included in the group, on the basis of the signal input from the operation inputting unit 13.

When the button b for addition is pressed with use of the input device 206, for example, the operation inputting unit 13 outputs a signal representing this operation to the presentation unit 12 and the editing unit 14.

The presentation unit 12 displays a list of time-series data that are not classified in the selected group in the information editing screen on the basis of the signal input from the operation inputting unit 13.

When time-series data is selected from the list of time-series data on the basis of the above and the button b for addition is subsequently pressed with use of the input device 206, the operation inputting unit 13 outputs a signal representing this operation to the presentation unit 12 and the editing unit 14.

The presentation unit 12 adds the selected time-series data to the selected group in the information editing screen on the basis of the signal input from the operation inputting unit 13. When time-series data is added, the graph of the added time-series data is also displayed by the presentation unit 12.

The editing unit 14 adds the selected time-series data to the selected group among the groups of the classification performed by the grouping unit 5 on the basis of the signal input from the operation inputting unit 13. In this manner, groups and time-series data can be selected or deleted in information used for generation of event information depending on determination made by a person with specialized knowledge on subject equipment.

When a group in the list of groups is selected and the button c for detailed group information is subsequently pressed with use of the input device 206, the operation inputting unit 13 outputs a signal representing this operation to the presentation unit 12. The presentation unit 12 switches the screen display from the information editing screen to a detailed group information screen on the basis of the signal input from the operation inputting unit 13.

The detailed group information screen is a screen for editing detailed information on the selected group. The detailed group information screen includes a list of time-series data included in the group, graphs of the time-series data, information on event waveforms included in the time-series data, and histograms related to the timings of occurrence of the event waveforms and results of analysis thereof, for example.

Figure 13:
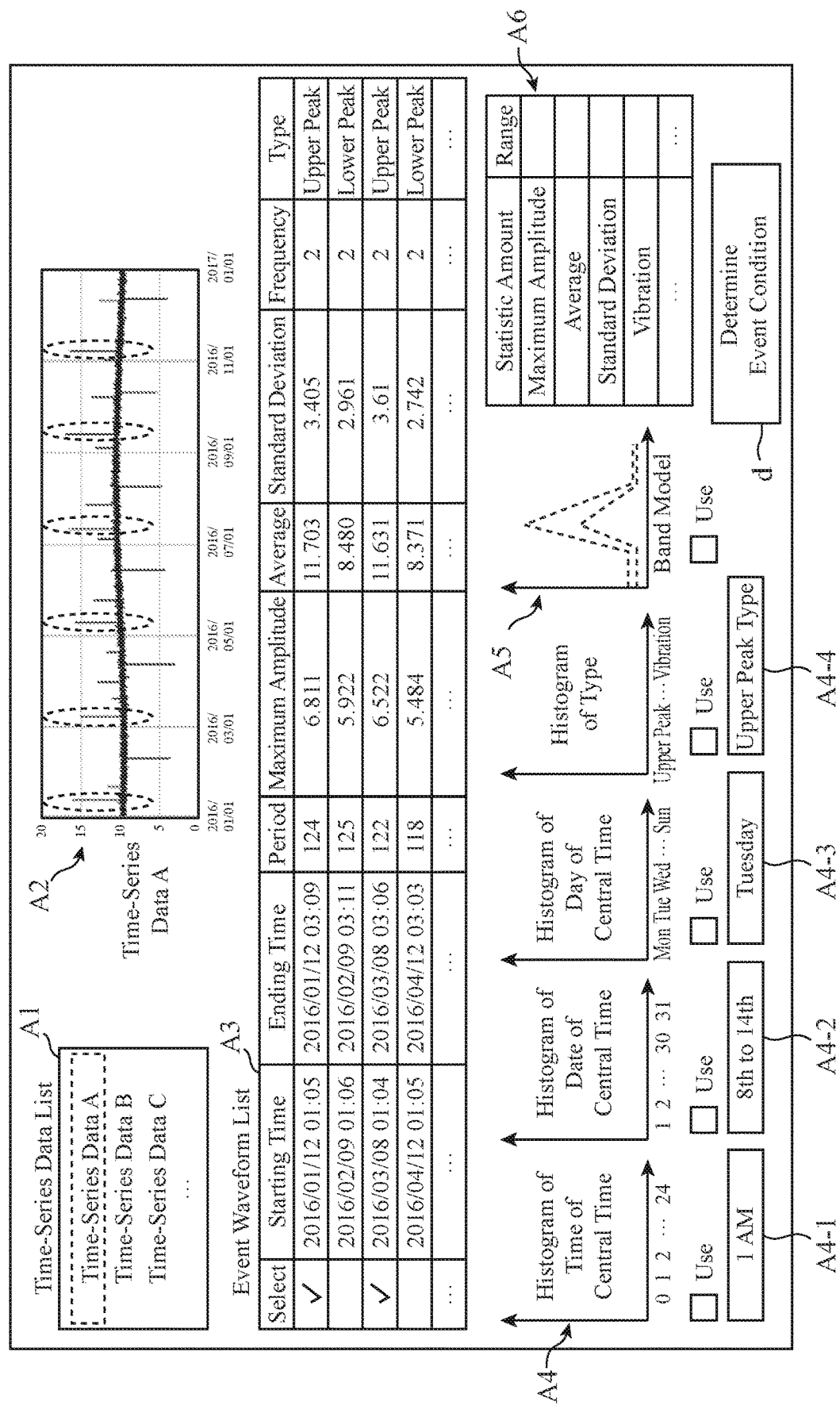
FIG. 13 is a diagram illustrating an example of a detailed group information screen.

FIG. 13 is a diagram illustrating an example of the detailed group information screen. As illustrated in FIG. 13, the detailed group information screen displays, in addition to a time-series data list A1, a graph A2 of time-series data, and an event waveform list A3, histograms A4, the band model A5, and statistic ranges A6, and further displays a button d for determining an event condition.

The time-series data list A1 is a list of time-series data included in a group selected from the group list illustrated in FIG. 12. The graph A2 of the time-series data A is a graph of the time-series data A selected from the time-series data list A1, and in FIG. 13, event waveforms (peaks) occurring at the same time among the time-series data A and the time-series data B and C are highlighted by being enclosed by broken lines. Note that the time-series data list A1 and the graph A2 are constituted by information included in the group list information.

The event waveform list A3 is a list of event waveforms included in the time-series data A.

For example, in the event waveform list A3, the starting times and the ending times of the event waveforms, the descriptive statistics of the event waveforms such as the durations, the maximum amplitudes, and the average values and the standard deviations of upward and downward variations, the frequencies, and the types of the event waveforms are displayed. Note that the event waveform list A3 is constituted by information included in the group list information.

The histograms A4 are histograms related to the times of occurrence and the types of the event waveforms. In the example of FIG. 13, histograms related to the times of occurrence of the event waveforms under three conditions of "time", "date", and "day", and a histogram related to the types of the event waveforms are displayed. Furthermore, a result of estimation of the event condition by the event information generating unit 6 is displayed in each of the histograms. The histograms A4 are generated by the event information generating unit 6 by using the group list information.

The band model A5 is the band model of the event waveforms. In addition, the ranges of various statistic amounts displayed in the event waveform list A3 are set in the statistic ranges A6. The band model A5 and the statistic ranges A6 are information generated by the event information generating unit 6 by using the group list information. The button d for determining an event condition is a button for determining an event condition resulting from editing.

The user can select an event waveform related to an actual event from the event waveform list A3 by using the input device 206 and use the selected event waveform for generation of event information. The histograms A4, the band model A5, and the statistic ranges A6, associated with the event waveform selected from the event waveform list A3 are presented by the presentation unit 12.

When the user inputs set values for the histograms A4, the band model A5, and the statistic ranges A6 by using the input device 206, the values are received by the operation inputting unit 13 and output to the presentation unit 12 and the editing unit 14. The presentation unit 12 interactively updates the values of the histograms A4, the band model A5, and the statistic ranges A6 in the detailed group information screen with the values input from the operation inputting unit 13. Furthermore, the editing unit 14 updates the information in the histograms A4, the band model A5, and the statistic ranges A6 with the values received by the operation inputting unit 13 and outputs the updated information to the event information generating unit 6.

When one or more bins in a histogram of the histograms A4 are selected with use of the input device 206, the operation inputting unit 13 outputs a signal representing this operation to the presentation unit 12. The presentation unit 12 may switch between a state in which an event waveform is selected and a state in which an event waveform is not selected in the event waveform list A3 on the basis of the signal input from the operation inputting unit 13. In this process, the presentation unit 12 may display results of estimation of event conditions that are common to event waveforms in the selected state. For example, in FIG. 13, as the results of estimation of event conditions that are common to the event waveforms in the selected state, an estimated value of the time of occurrence of an event waveform is displayed in a box A4-1, an estimated range of the period during which the event waveform occurs is displayed in a box A4-2, an estimation result of the day on which the event waveform occurs is displayed in a box A4-3, and an estimation result of the type of the event waveform is displayed in a box A4-4. Note that an estimation result may be able to be changed with use of the input device 206. A change with use of the input device 206 is reflected in the information to be used for generation of event information by the editing unit 14.

When the button d for determining an event condition is pressed with use of the input device 206, the editing unit 14 terminates the editing of estimated information on the event conditions presented by the presentation unit 12. The event information generating unit 6 estimates event conditions of an event related to the event waveform again by using the information edited by the editing unit 14. Event information including the thus estimated event conditions is stored in the event information storing unit 7.

The event information storing unit 7 may store event information for each of time-series data.

In addition, event conditions that are common within a group, such as the time of occurrence of an event, may be determined together for each group and stored for each time-series data in the event information storing unit 7.

Note that a plurality of events may relate to one time-series data.

In this case, event conditions related to a first one of the events are estimated by the event information generating unit 6, and the estimated event conditions are determined by the editing unit 14 as described above. Thereafter, the event information generating unit 6 deletes information on event waveforms related to the event for which the event conditions are determined. Event conditions related to second and subsequent events may be determined through similar procedures.

As described above, the time-series data processing device 1A according to the second embodiment includes the presentation unit 12, the operation inputting unit 13, and the editing unit 14. The presentation unit 12 presents information on event waveforms included in each of the groups of the classification performed by the grouping unit 5. The operation inputting unit 13 receives input of information on the presentation of the presentation unit 12. The editing unit 14 edits the information presented by the presentation unit 12 by using the information received by the operation inputting unit 13, and outputs the edited information to the event information generating unit 6. For example, the presentation unit 12 presents at least one of a list of groups, a list of time-series data included in a group, graphs of time-series data, a list of event waveforms included in time-series data, a histogram related to the time of occurrence of event waveforms, and the band model.

This enables editing of information to be used for generation of event information. For example, determination on event conditions made by a person with specialized knowledge on subject equipment can be reflected in event information, and an event occurring in the subject equipment can be identified with high accuracy.

Third Embodiment

In a third embodiment, co-occurrence rates of event waveforms are calculated with use of event time-series data. Event time-series data are data representing the number of occurrences of event waveforms at each predetermined time.

In a time-series data processing device according to the third embodiment, the co-occurrence rate calculating unit performs operation different from that in the first and second embodiments as described above, the basic configuration of the time-series data processing device is similar to that in the first embodiment. Thus, the configuration illustrated in FIG. 1 is assumed to be the configuration of the time-series data processing device according to the third embodiment below. In addition, the flow of processes to the generation of event information is similar to that in FIG. 3.

Figure 14:
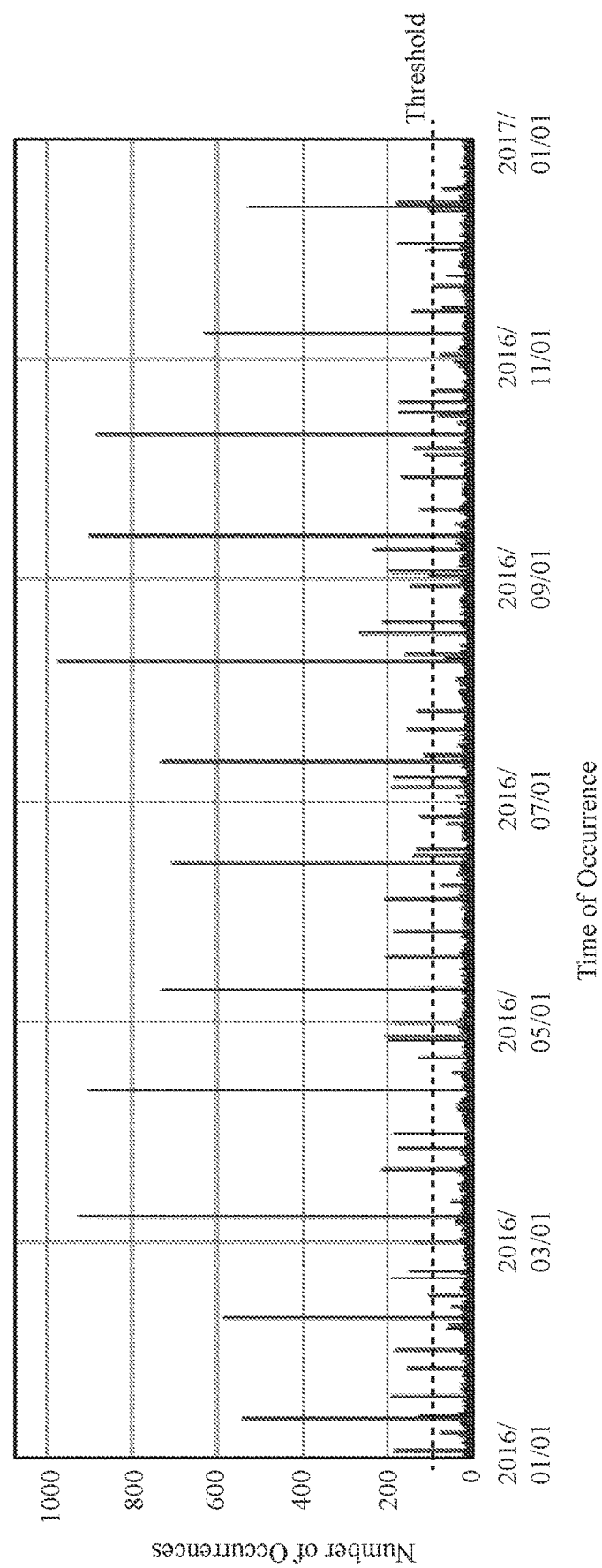
FIG. 14 is a graph illustrating an example of event time-series data in a third embodiment of the present invention.

FIG. 14 is a graph illustrating an example of event time-series data in the third embodiment. As illustrated in FIG. 14, the event time-series data can be expressed by a graph in which the horizontal axis represents the date and time and the vertical axis represents the number of occurrences of event waveforms.

The co-occurrence rate calculating unit 4 first generates event time-series data with the number of occurrences of event waveforms being "0". Subsequently, the co-occurrence rate calculating unit 4 adds "1" to vertical axis data at the time of occurrence of each event waveform of the generated event time-series data.

The time of occurrence of an event waveform may be any of the starting time of the event waveform, the ending time of the event waveform, the median time between the starting time and the ending time of the event waveform, and the time of a peak when the value of the event waveform is the largest or the smallest.

Alternatively, the co-occurrence rate calculating unit 4 may add "1" to vertical axis data at each of predetermined times from the starting time to the ending time of the event waveform in the event time-series data.

Still alternatively, the co-occurrence rate calculating unit 4 may add weighted values so that vertical axis data at the median time or the time of a peak is the largest and that the total vertical axis data of the period of the event waveform is "1" in the event time-series data. For example, in a case where an event waveform occurs from 1 AM to 3 AM, 0.25 is added to the vertical axis data at 1 AM, 0.5 is added to the vertical axis data at 2 AM that is the median time, and 0.25 is added to the vertical axis data at 3 AM.

Note that, depending on the method of extracting event waveforms, there may be errors between the starting time and the ending time of an extracted event waveform and the starting time and the ending time of an actual event waveform. Thus, when adding the weighted values so that vertical axis data at the median time or at the time of a peak is the largest and that the total vertical axis data of the period of the event waveform is "1" as described above, the co-occurrence rate calculating unit 4 may take an error of k into account and reduce the contributions around the starting time and the ending time of the event waveform.

Subsequently, the co-occurrence rate calculating unit 4 determines candidates for the period of occurrence of an event from the event time-series data generated as described above. For example, the co-occurrence rate calculating unit 4 compares a threshold θ with the number of occurrences of event waveforms in the event time-series data, and determines periods during which the number of occurrences of event waveforms is equal to or larger than the threshold θ as candidates for the period of occurrence of an event.

Alternatively, periods during which the number of occurrences of event waveforms is equal to or larger than the maximum number of occurrences of event waveforms×θ % may be set as candidates for the period of occurrence of an event.

Still alternatively, the number of occurrences of event waveforms may be selected so that the number of occurrences of event waveforms is the largest when the number of all the candidates of the period of occurrence of an event is not larger than θ.

In a period during which the number of occurrences of event waveforms is continuously equal to or larger than the threshold, the successive times may be collectively regarded as one candidate for the period of occurrence of an event.

Subsequently, the co-occurrence rate calculating unit 4 counts whether or not event waveforms occur during the determined candidate periods in each of a plurality of time-series data acquired by the first time-series data acquiring unit 2. For example, the co-occurrence rate calculating unit 4 generates numerical data that is "1" when event waveforms occur during a candidate for the period of occurrence of an event, or "0" when no event waveforms occur during a candidate for the period of occurrence of an event, as a result of the counting. Alternatively, the co-occurrence rate calculating unit 4 may generate numerical data that is "1" when a candidate of the period of occurrence of an event completely overlaps with the period during which an event waveform occurs, or a fractional value between 0 and 1 assigned depending on the proportion of the overlap between the periods. The co-occurrence rate calculating unit 4 generates list information from the numerical data for each time-series data.

FIG. 15 is a table illustrating an example of information output by the co-occurrence rate calculating unit 4 in the third embodiment, in which the list information described above is illustrated. In the records of the time-series data A illustrated in FIG. 15, "1" is set because the event waveform a occurs during a candidate for the period of occurrence of an event, and "0" is set because the event waveform c does not occur during the candidate for the period of occurrence of the event.

The grouping unit 5 classifies a plurality of time-series data acquired by the first time-series data acquiring unit 2 on the basis of the list information so that time-series data in which event waveforms occur at similar timings are classified in the same group.

For example, the grouping unit 5 may classify the time-series data into groups by k-means clustering, which regards one row (record information of time-series data) of the list information as a vector.

Alternatively, the grouping unit 5 may regard one row of the list information as a vector, generate an adjacency matrix by calculating the distances between time-series data for all combinations, and classify the time-series data into groups by such a method as spectral clustering using the generated adjacency matrix or community detection that regards the adjacency matrix as a network structure constituted by nodes and edges.

As described above, in the time-series data processing device 1 according to the third embodiment, the co-occurrence rate calculating unit 4 generates event time-series data representing the number of occurrences of event waveforms at each predetermined time in time-series data. The co-occurrence rate calculating unit 4 determines candidates for the time at which an event occurs on the basis of the number of occurrences of event waveforms represented by the event time-series data, and calculates numerical data representing whether or not an event waveform occurs at the times of the determined candidates. This also enables the degree to which event waveforms co-occur among time-series data to be accurately determined.

Fourth Embodiment

While peaks or increasing and decreasing patterns extracted from previous time-series data are extracted as event waveforms in the first embodiment, outlier data that are partial string data falling within an abnormality range are detected from previous time-series data and the detected outlier data are assumed to be event waveforms in a fourth embodiment.

Figure 16:
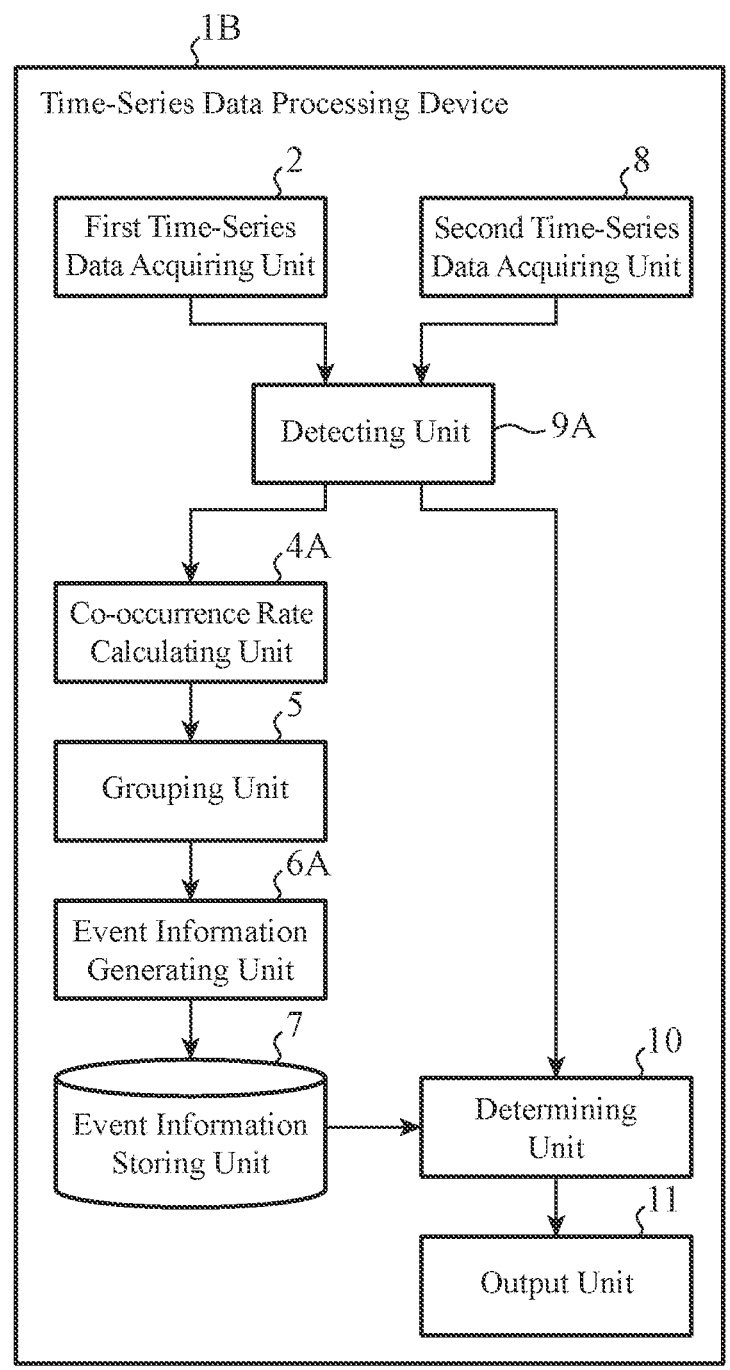
FIG. 16 is a block diagram illustrating a configuration of a time-series data processing device according to a fourth embodiment of the present invention.

FIG. 16 is a block diagram illustrating a configuration of a time-series data processing device 1B according to the fourth embodiment of the present invention. As illustrated in FIG. 16, in the time-series data processing device 1B, the event waveform extracting unit 3 in the time-series data processing device 1 illustrated in the first embodiment is replaced with a detecting unit 9A. Event waveforms are waveforms with suddenly changing data values, and are thus likely to be detected as outlier data.

Thus, the detecting unit 9A detects outlier data from each of a plurality of time-series data acquired by the first time-series data acquiring unit 2.

For example, the detecting unit 9A may perform detection of outlier data on all of the time-series data acquired by the first time-series data acquiring unit 2, and output information on the detected outlier data to the co-occurrence rate calculating unit 4A. The information on the outlier data output to the co-occurrence rate calculating unit 4A corresponds to the event waveform list information described in the first embodiment.

In addition, the detecting unit 9A divides the previous time-series data acquired by the first time-series data acquiring unit 2 into a plurality of sections, performs detection of outlier data on some of the sections of the time-series data for abnormality determination, and performs detection of outlier data on the remaining sections of the time-series data for use for generation of event information.

Subsequently, the detecting unit 9A performs detection of outlier data on sections of the time-series data selected from the above remaining sections for abnormality determination, and further performs detection of outlier data on the thus resulting remaining sections of the time-series data for use for generation of event information.

In this manner, the detecting unit 9A may repeat the processes described above until detection of outlier data is performed on all the sections of the time-series data obtained by the initial division for abnormality determination.

The co-occurrence rate calculating unit 4A calculates the co-occurrence rates of the outlier data detected by the detecting unit 9A among the time-series data. For example, the co-occurrence rate calculating unit 4A regards information on the outlier data as information on event waveforms, and calculates the co-occurrence rate in a manner similar to that in the first embodiment.

The grouping unit 5 classifies the time-series data into groups depending on the co-occurrence rates calculated by the co-occurrence rate calculating unit 4A.

The event information generating unit 6A determines the time at which the periods during which the outlier data occur overlap with each other among the time-series data included in each of the groups classified by the grouping unit 5, and generates event information that identifies an event related to the outlier data on the basis of the determined time. For example, the event information generating unit 6A regards the information on the outlier data as information on event waveforms, and generates event information in a manner similar to that in the first embodiment.

As described above, the time-series data processing device 1B according to the fourth embodiment includes the detecting unit 9A, the co-occurrence rate calculating unit 4A, the grouping unit 5, and the event information generating unit 6A. The detecting unit 9A detects outlier data from each of a plurality of time-series data. The co-occurrence rate calculating unit 4A calculates the co-occurrence rates of the outlier data among the time-series data. The grouping unit 5 classifies the time-series data into groups depending on the co-occurrence rates of the outlier data. The event information generating unit 6A determines the time at which the periods during which the outlier data occur overlap with each other among the time-series data included in each group, and generates event information that identifies an event related to the outlier data on the basis of the determined time.

This configuration enables event information to be obtained with use of time-series data observed in subject equipment even when information identifying an event in the subject equipment is not provided.

Note that the embodiments of the present invention can be freely combined, any components in the embodiments can be modified, and any components can be omitted in the embodiments within the scope of the invention.

INDUSTRIAL APPLICABILITY

A time-series data processing device according to the present invention is capable of obtaining event information by using time-series data observed in subject equipment even when information identifying an event in the subject equipment is not provided, and can thus be used for abnormality detection in various kinds of equipment.

REFERENCE SIGNS LIST 1, 1A, 1B: Time-series data processing device, 2: First time-series data acquiring unit, 3: Event waveform extracting unit, 4, 4A: Co-occurrence rate calculating unit, 5: Grouping unit, 6, 6A: Event information generating unit, 7: Event information storing unit, 8: Second time-series data acquiring unit, 9, 9A: Detecting unit, 10: Determining unit, 11: Output unit, 12: Presentation unit, 13: Operation inputting unit, 14: Editing unit, 200: Processing circuit, 201: Signal line, 202: Auxiliary storage device, 203: Input IF, 204: Display IF, 205, 207: Cable, 206: Input device, 208: Display, 209: Processor, 210: Memory.

The invention claimed is:

1. A time-series data processing device comprising: processing circuitry to:
   extract waveform data estimated to be changed because of an event having occurred in subject equipment from each of a plurality of time-series data sequentially observed over time from the subject equipment;
   calculate a plurality of co-occurrence rates of the waveform data extracted among time-series data;
   classify the time-series data into groups depending on the plurality of co-occurrence rates of the waveform data calculated and an associated matrix, the associated matrix being formed on a basis of results of comparing the plurality of co-occurrence rates of the waveform data to a threshold; and
   determine time at which periods of occurrence of the waveform data overlap with each other among the time-series data included in a group into which the time-series data are classified, and generate event information identifying an event related to the waveform data on a basis of the determined time.

2. The time-series data processing device according to claim 1, the processing circuitry further comprising to:
   detect outlier data from the time-series data, the outlier data being partial string data falling within an abnormality range; and
   determine abnormality of the subject equipment on a basis of the outlier data detected and the event information generated.

3. The time-series data processing device according to claim 1,
   wherein the processing circuitry extracts the waveform data on a basis of a combination of partial string data having values that continuously increase or decrease in the time-series data.

4. The time-series data processing device according to claim 1,
   wherein the processing circuitry generates the event information on a basis of a starting time and an ending time of the waveform data, a duration of the waveform data, descriptive statistics of the waveform data, a maximum amplitude and a frequency of the waveform data, and a type of the waveform data.

5. The time-series data processing device according to claim 1,
   wherein the processing circuitry calculates any of a first co-occurrence rate, a second co-occurrence rate, and a third co-occurrence rate,
   the first co-occurrence rate being a value obtained by dividing a number of times at which periods of occurrence of the waveform data overlap with each other among the time-series data by a number of the waveform data occurring in one of the time-series data,
   the second co-occurrence rate being a value obtained by dividing the number of times at which the periods of occurrence of the waveform data overlap with each other among the time-series data by a number of the waveform data occurring in another of the time-series data, and
   the third co-occurrence rate being a harmonic mean of the first co-occurrence rate and the second co-occurrence rate.

6. The time-series data processing device according to claim 1,
   wherein the processing circuitry generates event time-series data representing a number of occurrences of the waveform data at each time in the time-series data, determines a candidate for a period of occurrence of an event on a basis of a number of occurrences of an event waveform represented by the event time-series data, and calculates, as the co-occurrence rate of the waveform data, numerical data representing whether or not the waveform data occur during the determined candidate period.

7. The time-series data processing device according to claim 1,
wherein the processing circuitry calculates a histogram on time of occurrence of the waveform data in the time-series data, and estimates time of a bin with a maximum frequency in the histogram as time of occurrence of an event related to the waveform data.

8. The time-series data processing device according to claim 1,
wherein the processing circuitry generates event information including a starting time and an ending time of an event, or generates event information including, in addition to the starting time and the ending time of the event, at least one of a duration of the waveform data, descriptive statistics of the waveform data, a maximum amplitude and a frequency of the waveform data, a type of the waveform data, and a band model.

9. The time-series data processing device according to claim 1, the processing circuitry further comprising to:
present information on the waveform data included in each of a plurality of groups into which the time-series data are classified;
receive an input of operation on presentation; and
edit the information presented on a basis of the input of operation received, and output a result of edition.

10. The time-series data processing device according to claim 9,
wherein the processing circuitry presents at least one of a list of groups, a list of the time-series data included in a group, a graph of the waveform data, the waveform data having periods of occurrence that overlap with each other among the time-series data included in a group, a list of the waveform data included in the time-series data, a histogram on time of occurrence of the waveform data, and a band model.

11. The time-series data processing device according to claim 2, wherein,
the processing circuitry:
detects the outlier data from each of a plurality of time-series data sequentially observed over time from subject equipment, the outlier data being partial string data falling within an abnormality range;
calculates a co-occurrence rate of the outlier data detected among time-series data;
classifies the time-series data into groups depending on the co-occurrence rate of the outlier data calculated; and
determines time at which periods of occurrence of the outlier data overlap with each other among the time-series data included in a group into which the time-series data are classified, and generates event information identifying an event related to the outlier data on a basis of the determined time.

12. A time-series data processing system comprising:
processing circuitry to:
extract waveform data estimated to be changed because of an event having occurred in subject equipment from each of a plurality of time-series data sequentially observed over time from the subject equipment;
calculate a plurality of co-occurrence rates of the waveform data extracted among the time-series data;
classify the time-series data into groups depending on the plurality of co-occurrence rates of the waveform data calculated and an associated matrix, the associated matrix being formed on a basis of results of comparing the plurality of co-occurrence rates of the waveform data to a threshold;
determine time at which periods of occurrence of the waveform data overlap with each other among the time-series data included in a group into which the time-series data are classified, and generate event information identifying an event related to the waveform data on a basis of the determined time;
detect outlier data from the time-series data, the outlier data being partial string data falling within an abnormality range; and
determine abnormality of the subject equipment on a basis of the outlier data detected and the event information generated.

13. A time-series data processing method comprising:
extracting waveform data estimated to be changed because of an event having occurred in subject equipment from each of a plurality of time-series data sequentially observed over time from the subject equipment;
calculating a plurality of co-occurrence rates of the waveform data extracted among the time-series data;
classifying the time-series data into groups depending on the plurality of co-occurrence rates of the waveform data calculated and an associated matrix, the associated matrix being formed on a basis of results of comparing the plurality of co-occurrence rates of the waveform data to a threshold; and
determining time at which periods of occurrence of the waveform data overlap with each other among the time-series data included in a group into which the time-series data are classified, and generating event information identifying an event related to the waveform data on a basis of the determined time.

14. The time-series data processing method according to claim 13, further comprising:
detecting outlier data from the time-series data, the outlier data being partial string data falling within an abnormality range; and
determining abnormality of the subject equipment on a basis of the outlier data detected and the event information generated.

* * * * *